US012789472B2

(12) United States Patent
Peleg

(10) Patent No.: US 12,789,472 B2
(45) Date of Patent: Nov. 10, 2026

(54) ARTICLE AND METHOD FOR MANUFACTURING THE ARTICLE

(71) Applicant: Moon Creative Lab Inc., Palo Alto, CA (US)

(72) Inventor: Danit Peleg, Tel Aviv (IL)

(73) Assignee: Moon Creative Lab Inc., Palo Alto, CA (US)

( * ) Notice: Subject to any disclaimer, the term of this patent is extended or adjusted under 35 U.S.C. 154(b) by 72 days.

(21) Appl. No.: 18/575,645

(22) PCT Filed: Jun. 27, 2022

(86) PCT No.: PCT/JP2022/025430
§ 371 (c)(1),
(2) Date: Dec. 29, 2023

(87) PCT Pub. No.: WO2023/276908
PCT Pub. Date: Jan. 5, 2023

(65) Prior Publication Data
US 2024/0286362 A1 Aug. 29, 2024

(30) Foreign Application Priority Data
Jul. 1, 2021 (JP) ................................ 2021-110402

(51) Int. Cl.
*B29C 64/40* (2017.01)
*B29C 64/118* (2017.01)
(Continued)

(52) U.S. Cl.
CPC ............ *B29C 64/40* (2017.08); *B29C 64/118* (2017.08); *B29C 64/188* (2017.08); *B33Y 10/00* (2014.12);
(Continued)

(58) Field of Classification Search
CPC ..... B29C 64/40; B29C 64/118; B29C 64/188; B29C 64/30; B33Y 10/00; B33Y 40/20;
(Continued)

(56) References Cited

U.S. PATENT DOCUMENTS 4,292,100 A 9/1981 Higashiguchi
4,772,347 A 9/1988 Fowler
(Continued)

FOREIGN PATENT DOCUMENTS

CN 108297469 A 7/2018
CN 111132834 A 5/2020
(Continued)

OTHER PUBLICATIONS

International Search Report and Written Opinion for International Application No. PCT/JP2022/025430 mailed Sep. 13, 2022.
(Continued)

*Primary Examiner* — Brian Handville
(74) *Attorney, Agent, or Firm* — Lempia Summerfield Katz LLC

(57) ABSTRACT

To provide an article that can be manufactured easily by using a 3D printer and a method for manufacturing the article. A method for manufacturing an article by using a 3D printer, comprising: printing a first resin layer by using the 3D printer; printing a second resin layer on the first resin layer using a material different from a material of the first resin layer by using the 3D printer; printing a third resin layer on the second resin layer using a material different from a material of the second resin layer by using the 3D printer, wherein the first resin layer is in contact with the third resin layer in a partial region of the first resin layer, the first resin layer and the third resin layer are composed of a water-insoluble material, the second resin layer is composed
(Continued)

of a water-soluble material, and a single article is formed by the first resin layer and the third resin layer.

24 Claims, 23 Drawing Sheets

(51) Int. Cl.

| | |
|---|---|
| ***B29C 64/188*** | (2017.01) |
| ***B33Y 10/00*** | (2015.01) |
| ***B33Y 40/20*** | (2020.01) |
| ***B33Y 70/00*** | (2020.01) |
| ***B33Y 80/00*** | (2015.01) |
| *B29K 29/00* | (2006.01) |
| *B29K 75/00* | (2006.01) |
| *B29L 31/48* | (2006.01) |

(52) U.S. Cl.
CPC ............... *B33Y 40/20* (2020.01); *B33Y 70/00* (2014.12); *B33Y 80/00* (2014.12); *B29K 2029/04* (2013.01); *B29K 2075/00* (2013.01); *B29K 2995/0062* (2013.01); *B29L 2031/48* (2013.01)

(58) Field of Classification Search
CPC .... B33Y 70/00; B33Y 80/00; B29K 2029/04; B29K 2075/00; B29K 2995/0062; B29L 2031/48; Y02P 90/30
See application file for complete search history.

(56) References Cited

U.S. PATENT DOCUMENTS

| | | | | |
|---|---|---|---|---|
| 8,993,061 | B2 * | 3/2015 | Jones | B29C 64/106 427/389.9 |
| 11,584,089 | B2 | 2/2023 | Shitrit et al. | |
| 2002/0098329 | A1 | 7/2002 | Abrams | |
| 2003/0180494 | A1 | 9/2003 | Lu | |
| 2003/0208888 | A1 | 11/2003 | Fearing | |
| 2006/0135021 | A1 | 6/2006 | Calhoun | |
| 2008/0118727 | A1 | 5/2008 | Andersen | |
| 2011/0104430 | A1 | 5/2011 | Mehrabi | |
| 2013/0255103 | A1 * | 10/2013 | Dua | A41D 27/245 428/57 |
| 2016/0009030 | A1 * | 1/2016 | Mark | B29C 31/048 264/308 |
| 2017/0268133 | A1 | 9/2017 | Graley | |
| 2017/0341305 | A1 * | 11/2017 | Miller | B29C 64/386 |
| 2019/0184619 | A1 | 6/2019 | Simonin | |
| 2020/0047418 | A1 | 2/2020 | Kumaki et al. | |
| 2020/0198250 | A1 | 6/2020 | Shitrit et al. | |
| 2022/0193982 | A1 | 6/2022 | Yamasue | |

FOREIGN PATENT DOCUMENTS

| | | | | |
|---|---|---|---|---|
| JP | 2019172924 | A | 10/2019 | |
| JP | 2019531950 | A | 11/2019 | |
| JP | 2020029091 | A | 2/2020 | |
| JP | 2020523219 | A | 8/2020 | |
| JP | 7073848 | B2 | 5/2022 | |
| WO | 2018224395 | A1 | 12/2018 | |
| WO | WO-2020190277 | A1 * | 9/2020 | B33Y 10/00 |
| WO | 2021104920 | A1 | 6/2021 | |
| WO | 2022053428 | A1 | 3/2022 | |

OTHER PUBLICATIONS

"Fabric Cutting Process in a Typical Bangladeshi Garment Factory" (2019) https://web.archive.org/web/20190124210001/https://www.youtube.com/watch?app=desktop&v=CWpbfn93Lyw pp. 1-3.

"The basics of plasma treatment—what is Plasma?", Tantec, https://tantec.com/the-basics-of-plasma-treatment/ (2020) pp. 1-7.

https://www.reddit.com/r/sewing/comments/7qehf5/why_arent_cotton_fabrics_preshrunk_and_why_do_we/ "Why aren't cotton fabrics pre-shrunk? And why do we have to pre-shrink cotton fabrics when we sew garments but clothes we buy off the rack aren't pre-shrunk?" (2018).

Written Opinion for International App. PCT/JP2022/025430 mailed Sep. 13, 2022.

European Search Opinion for EP Application No. 22833055.1-1103 mailed on Jun. 10, 2025.

Supplementary European Search Report for EP Application No. 22833055.1-1103 mailed on Jun. 10, 2025.

* cited by examiner

[Figure 1]
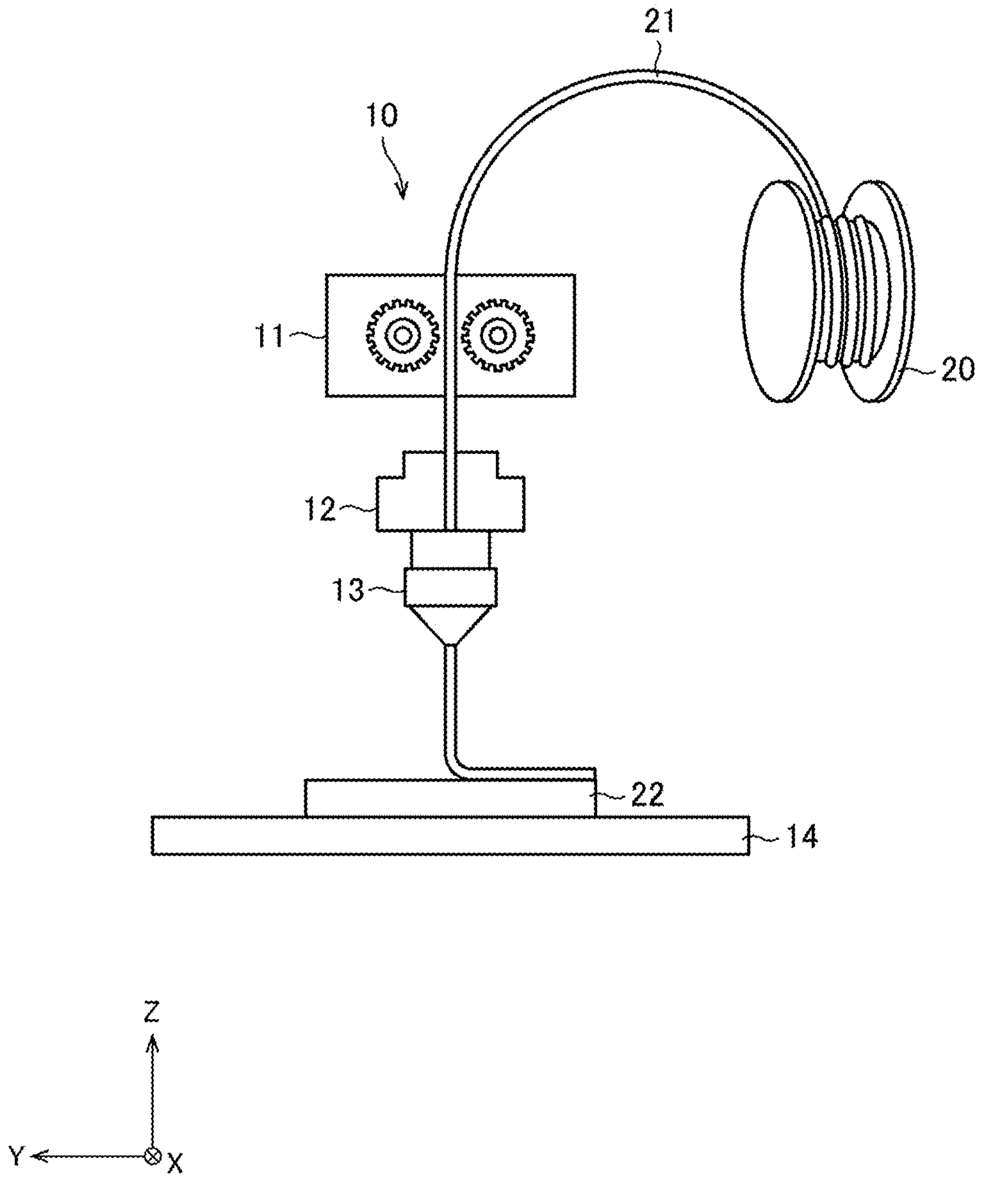

[Figure 2A]
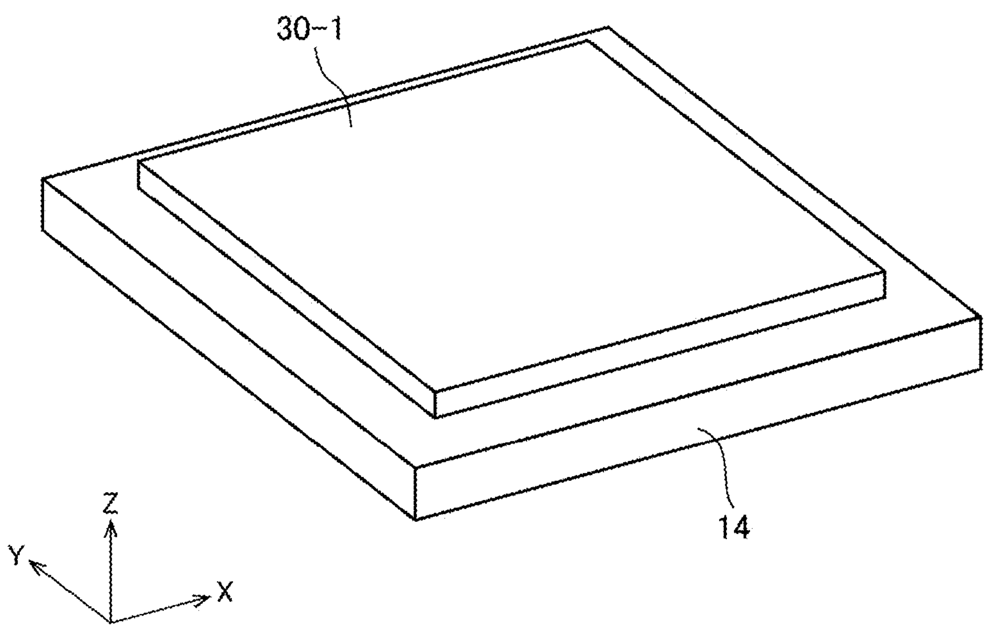
[Figure 2B]
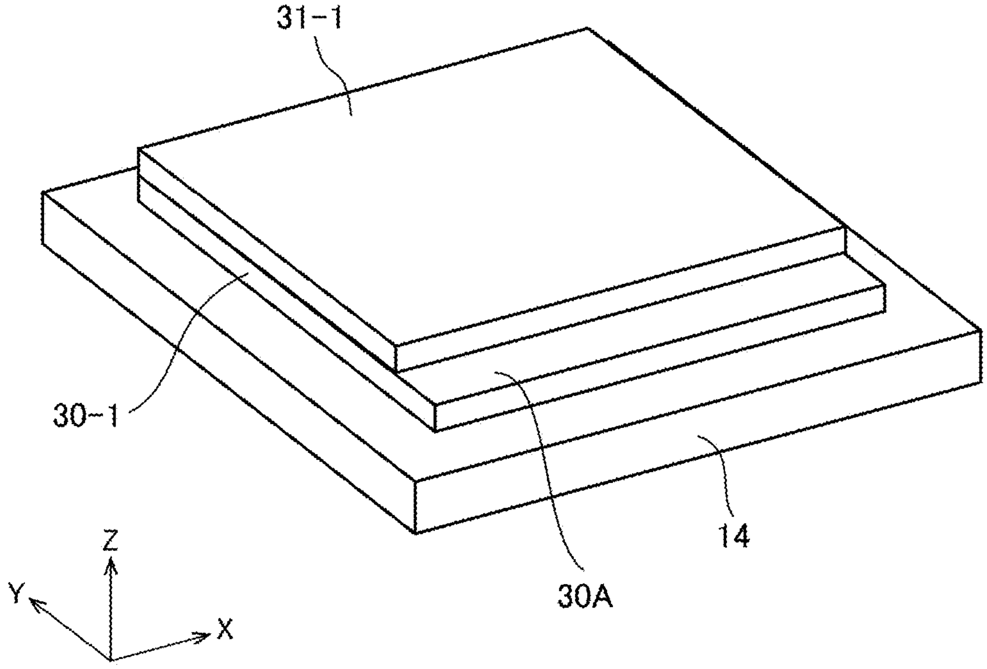

[Figure 2C]
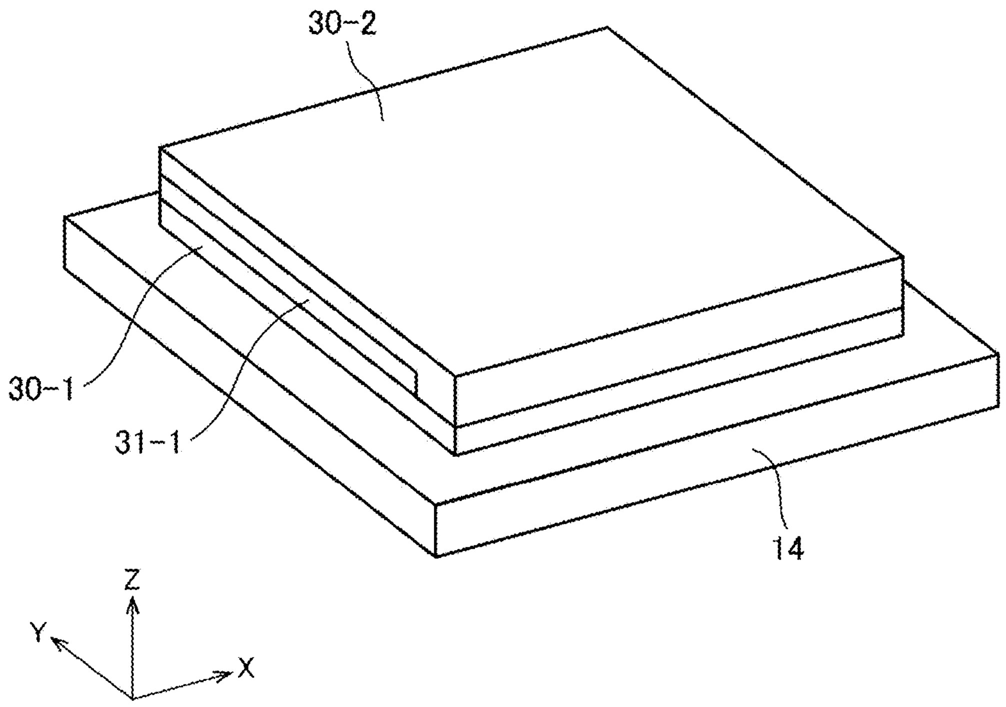
[Figure 2D]
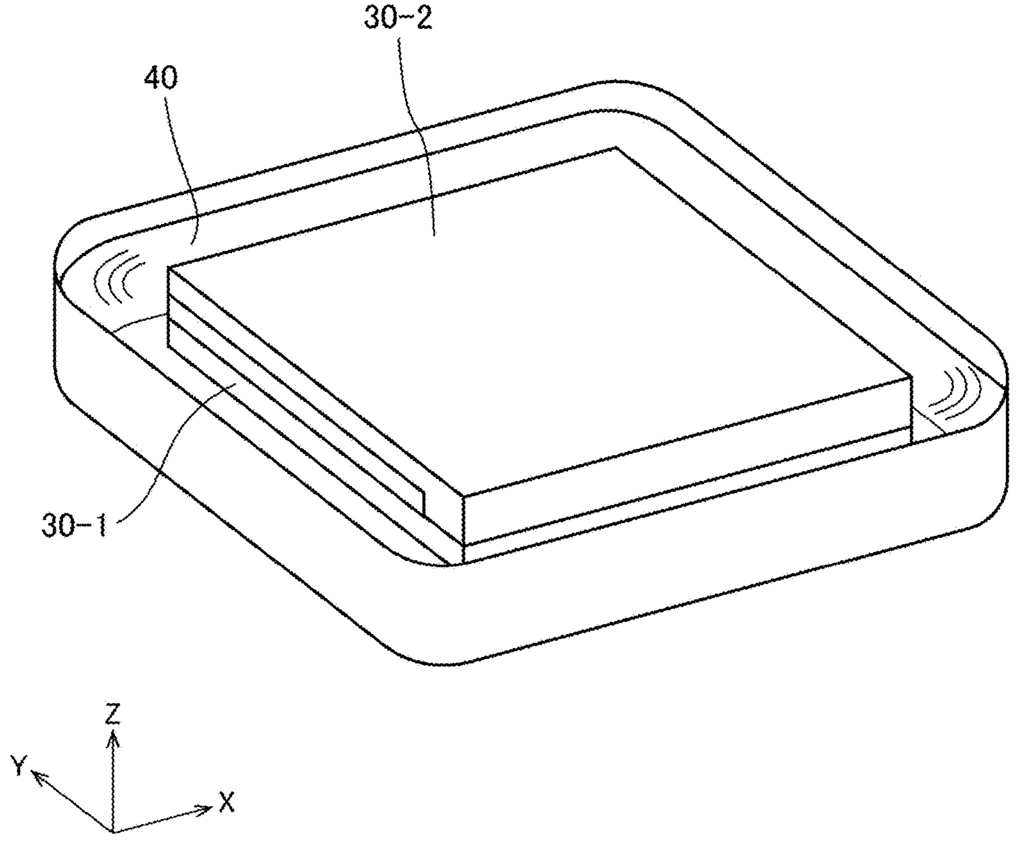

[Figure 2E]
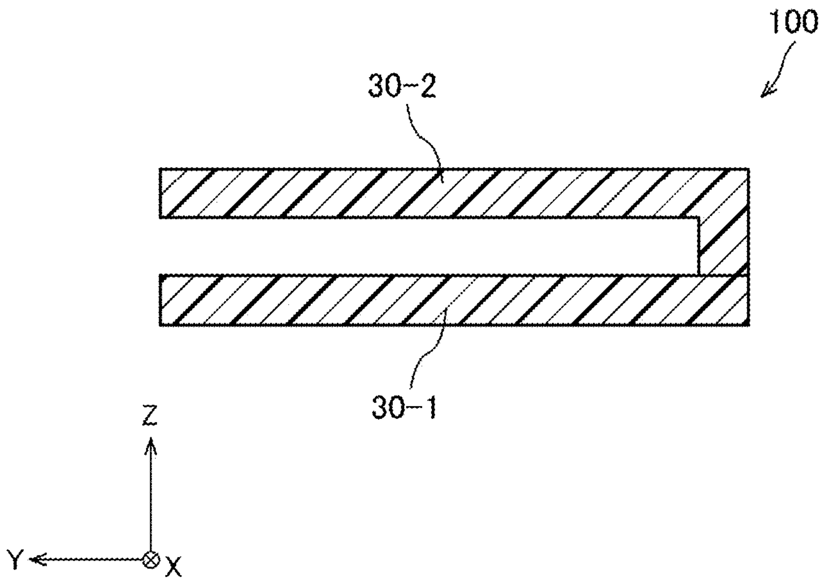
[Figure 2F]
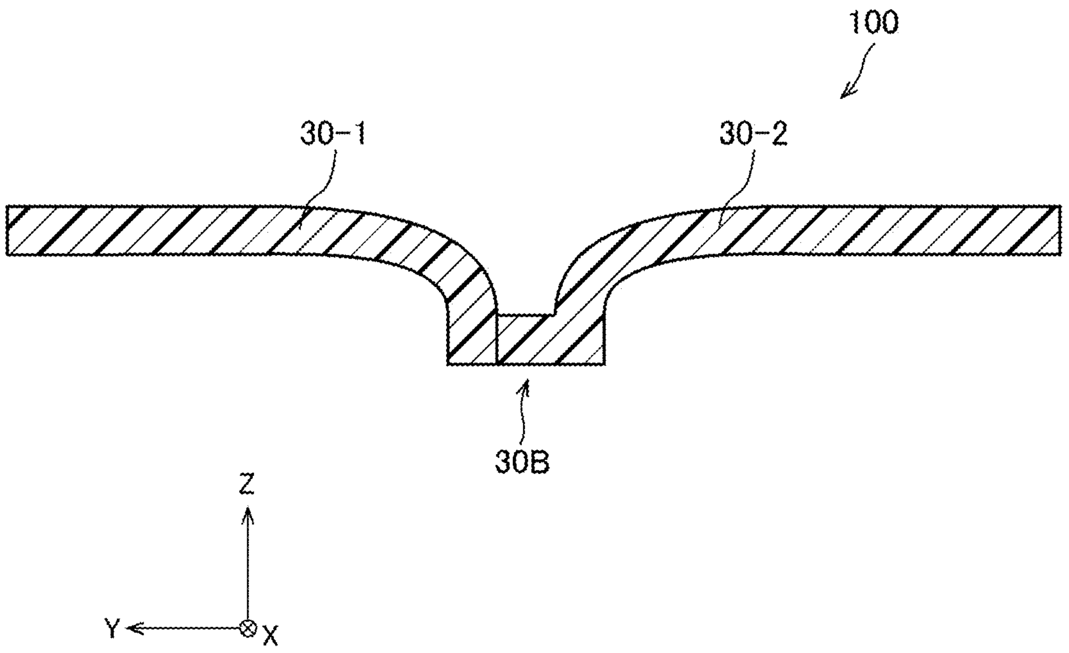

[Figure 2G]
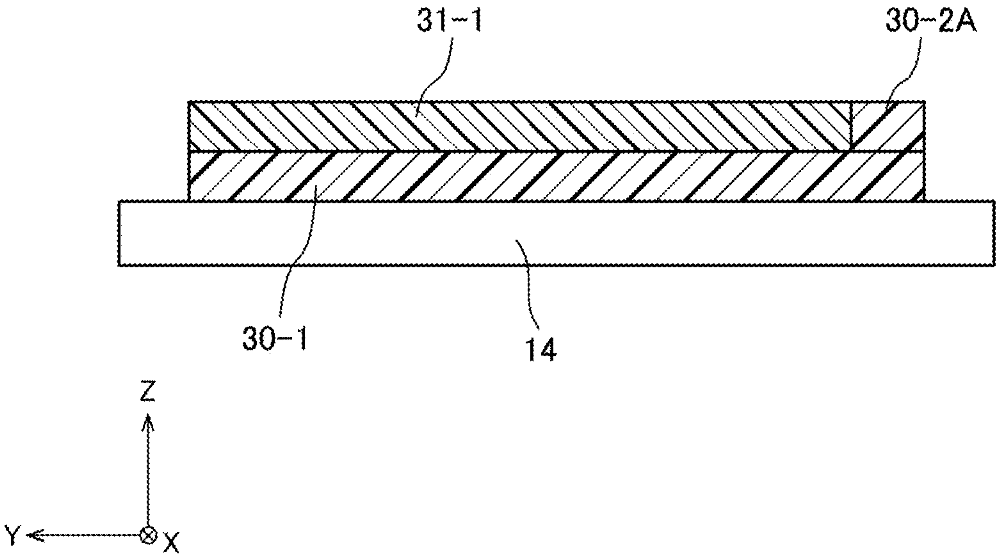
[Figure 2H]
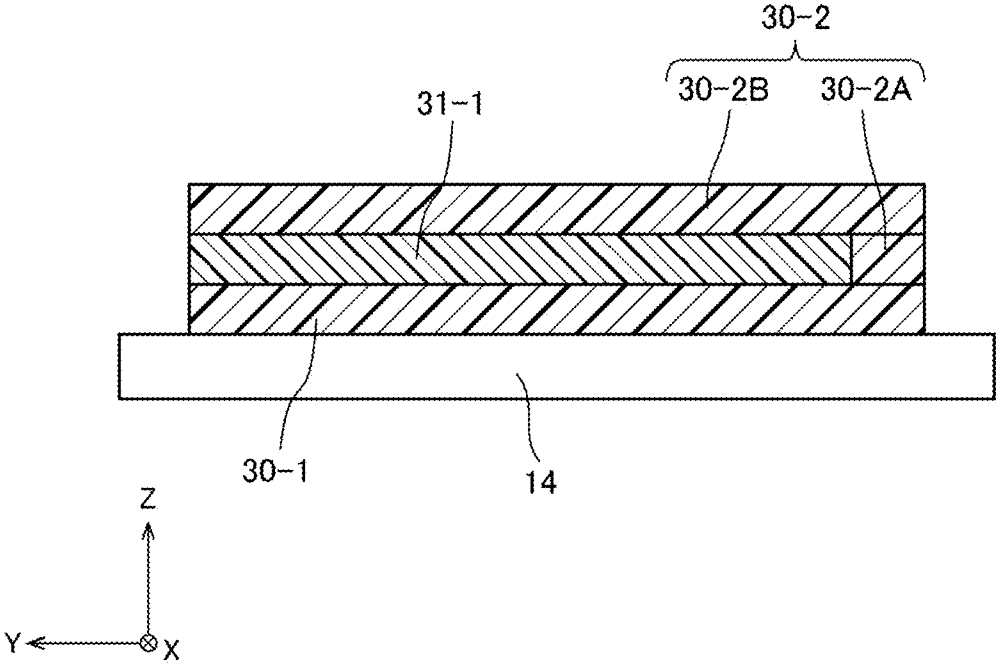

[Figure 3]
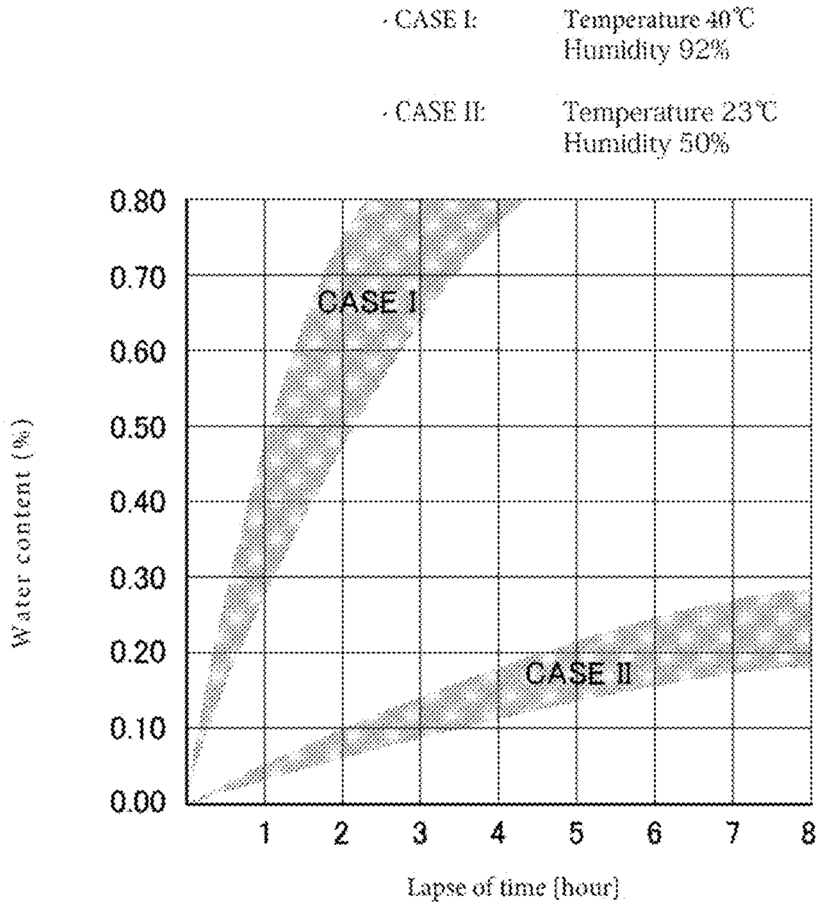
[Figure 4A]
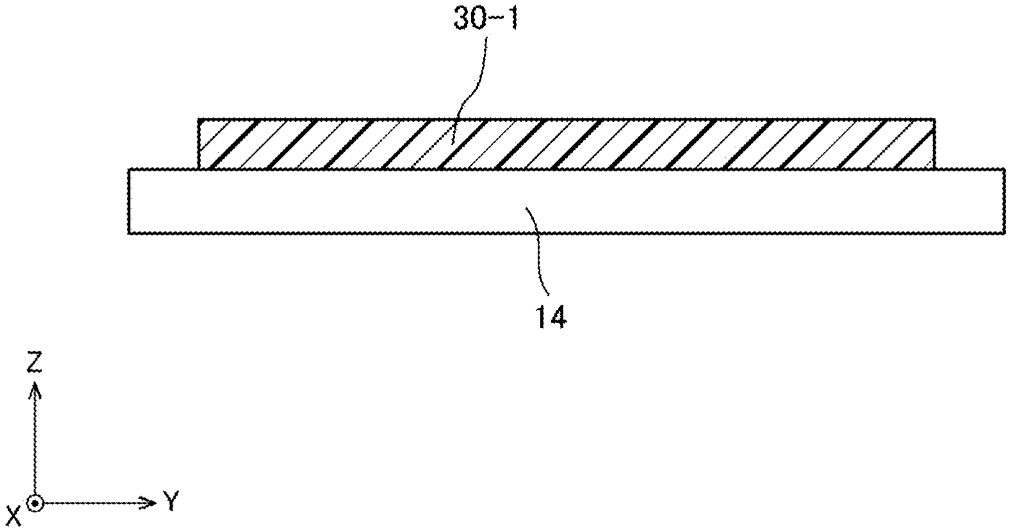

[Figure 4B]
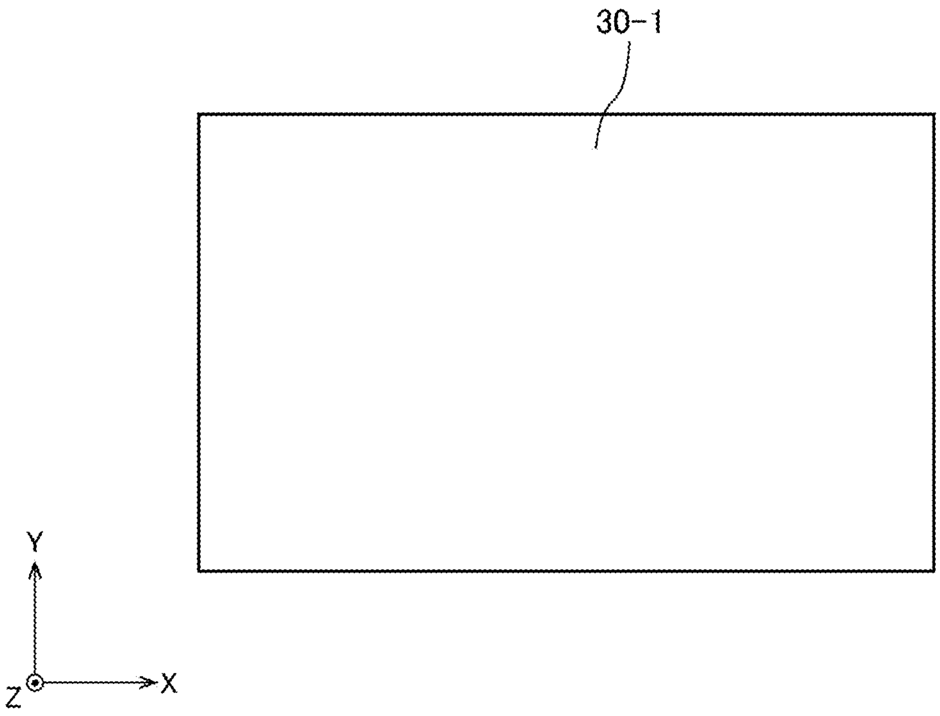
[Figure 4C]
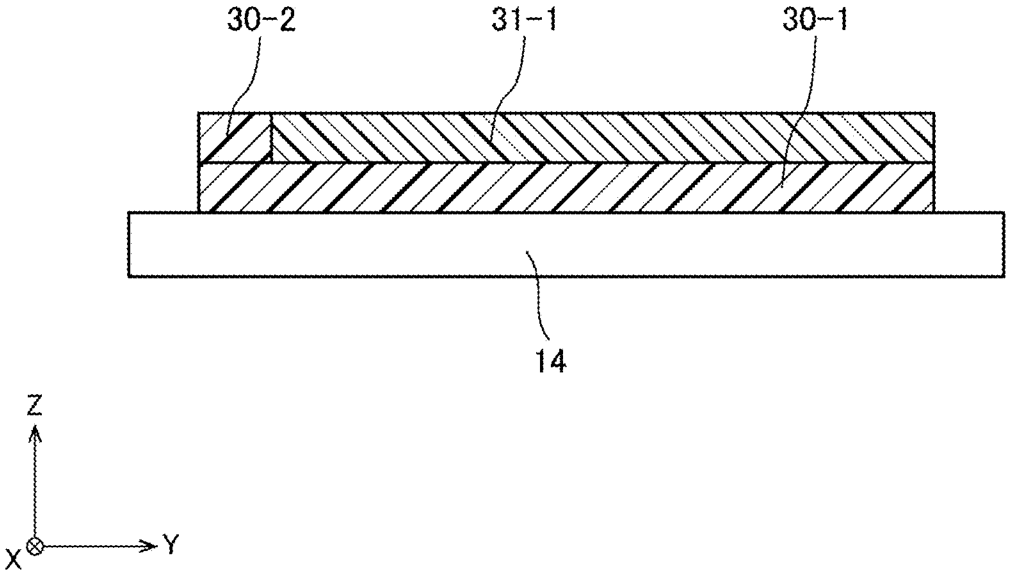

[Figure 4D]
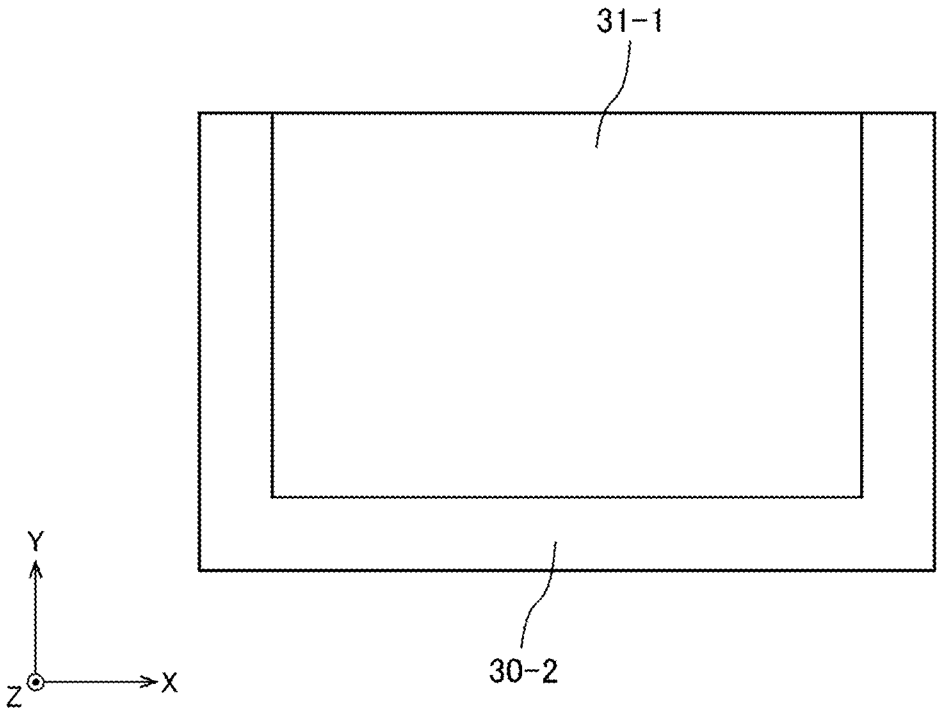
[Figure 4E]
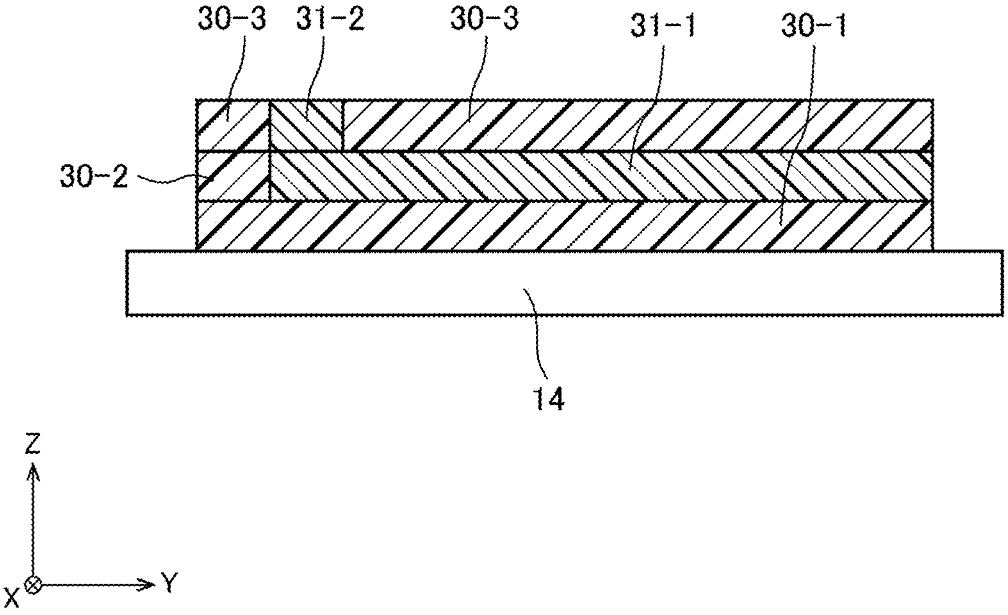

[Figure 4F]
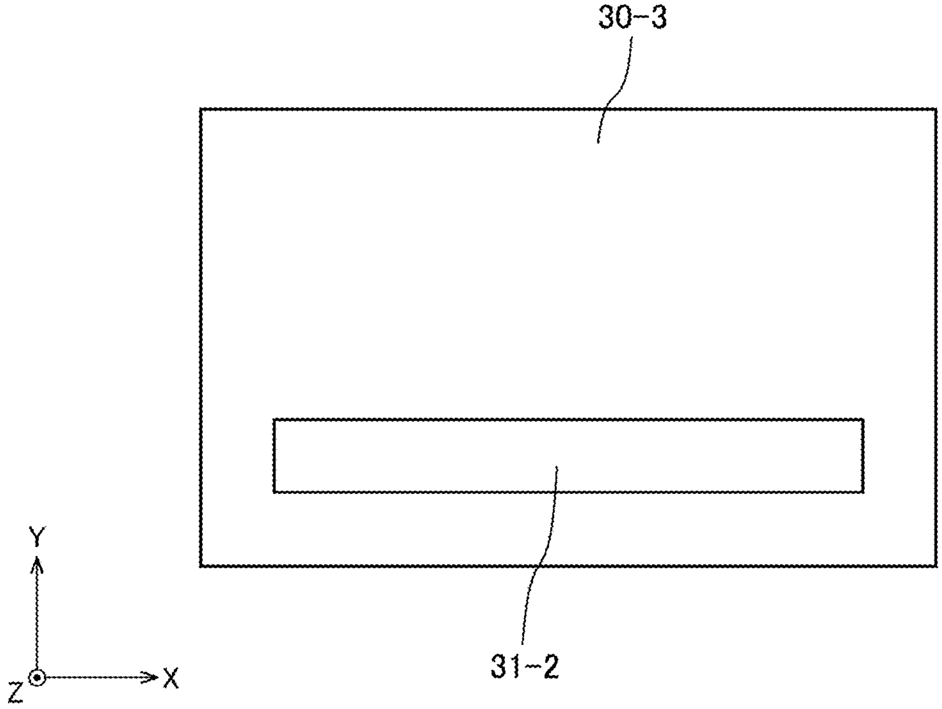
[Figure 4G]
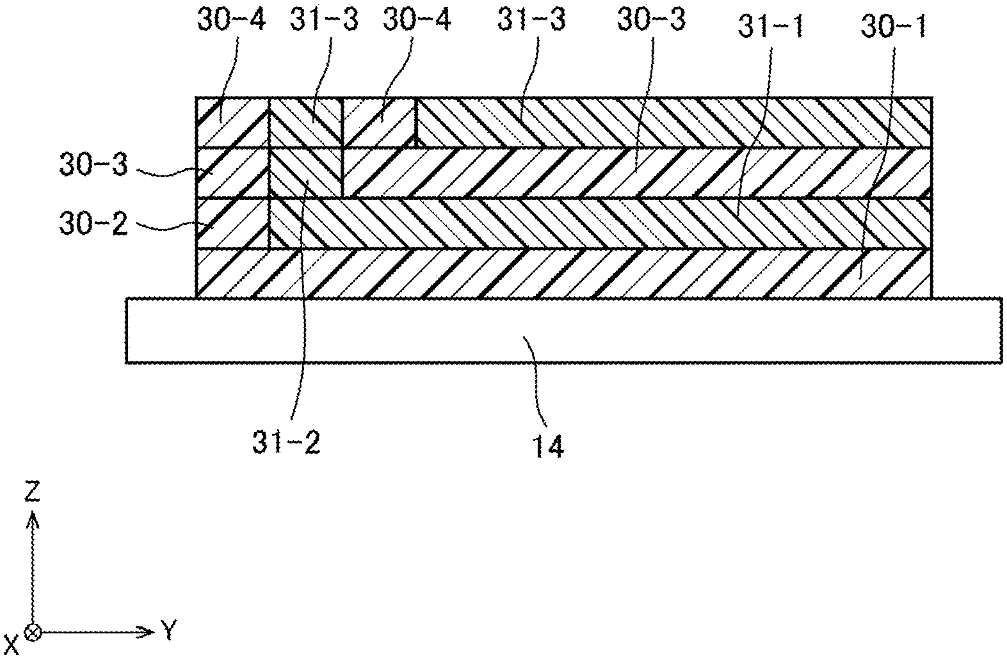

[Figure 4H]
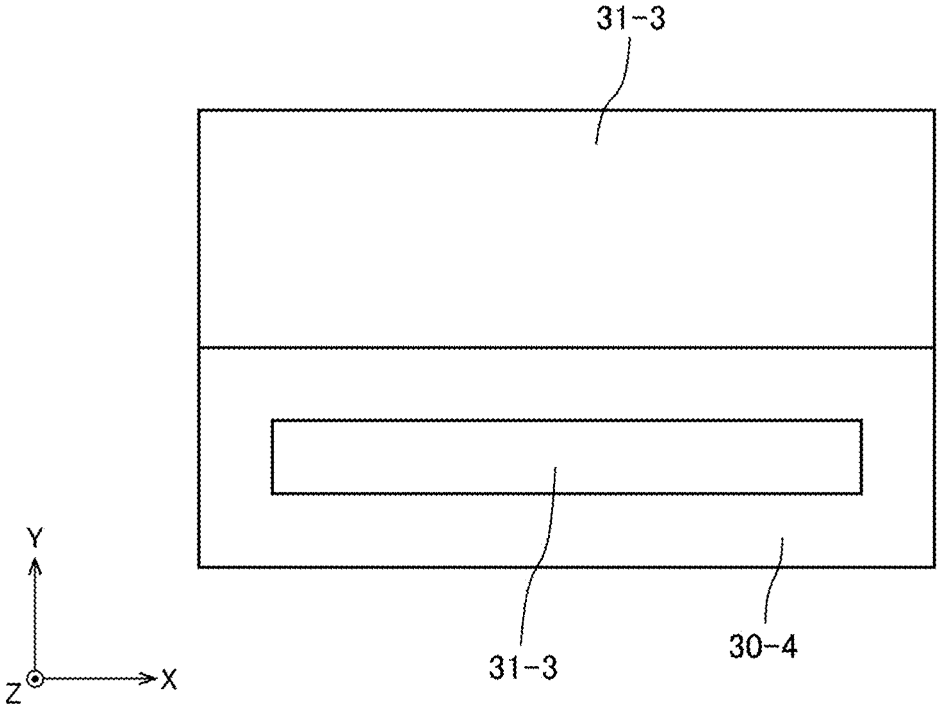
[Figure 4I]
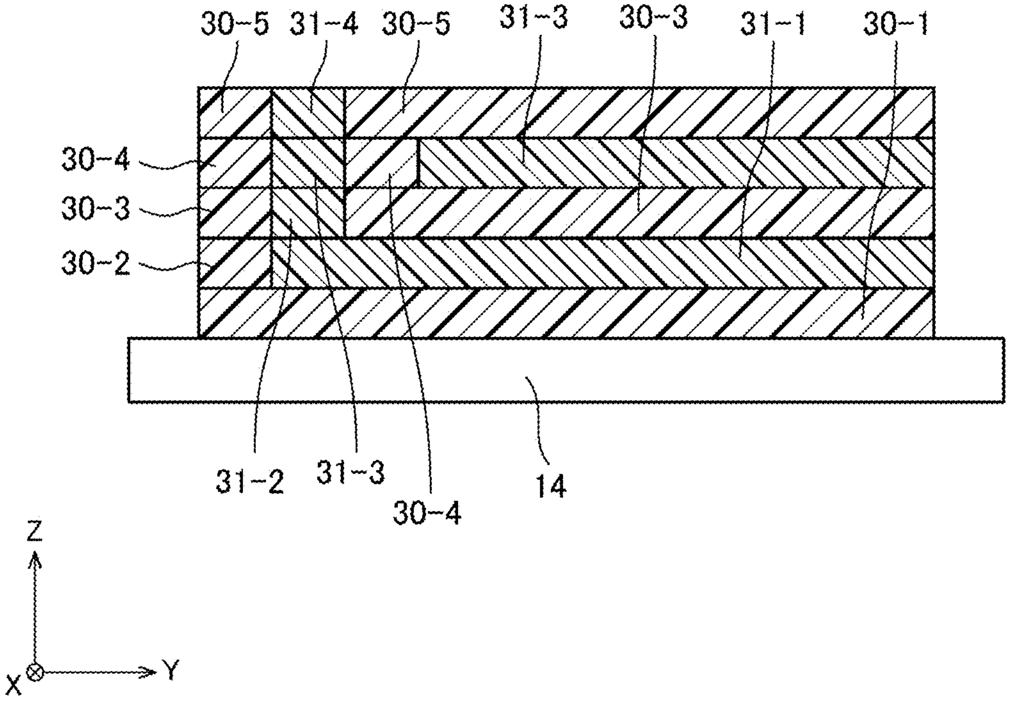

[Figure 4J]
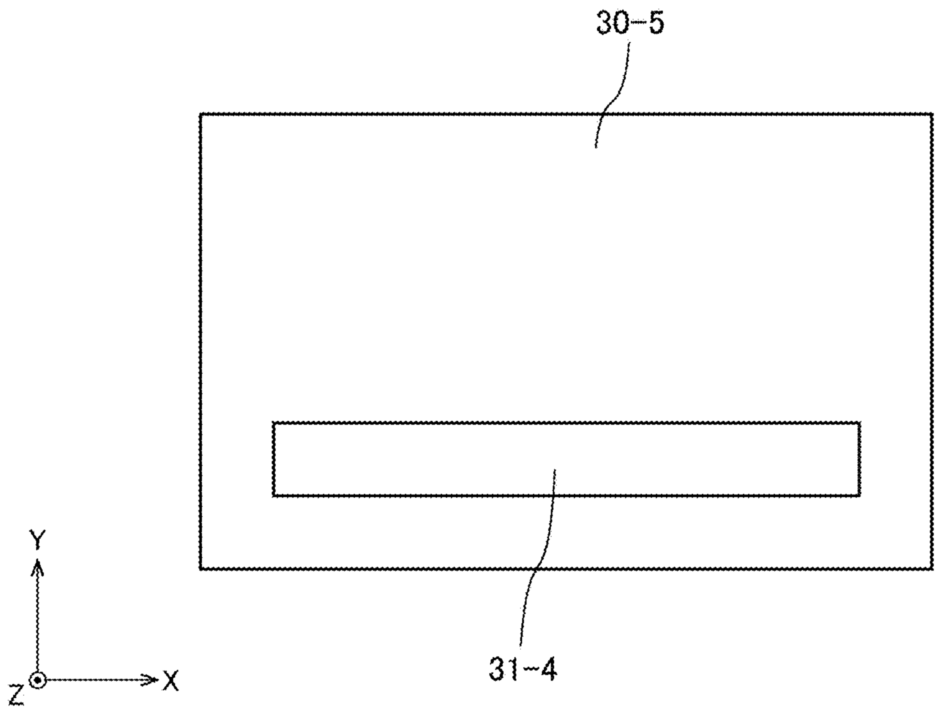
[Figure 4K]
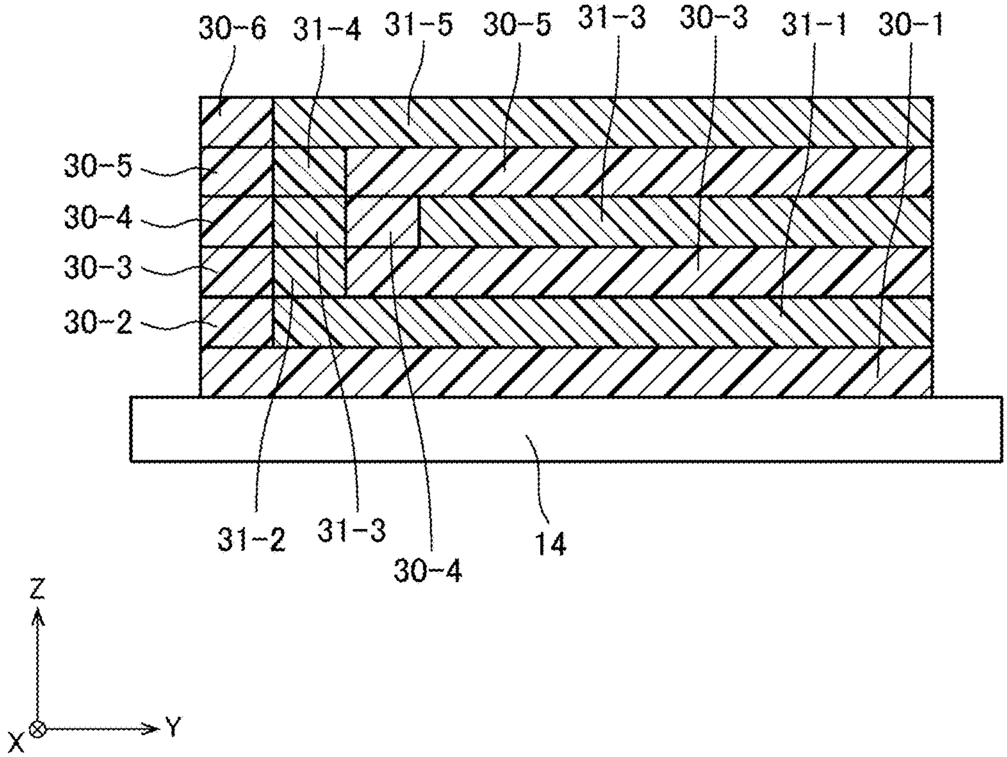

[Figure 4L]
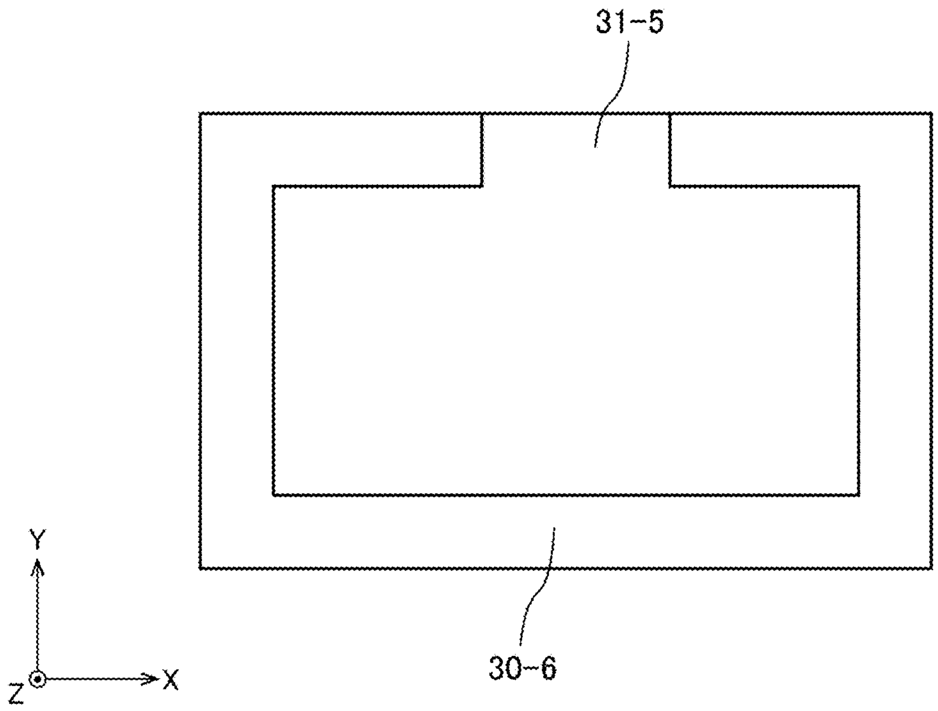
[Figure 4M]
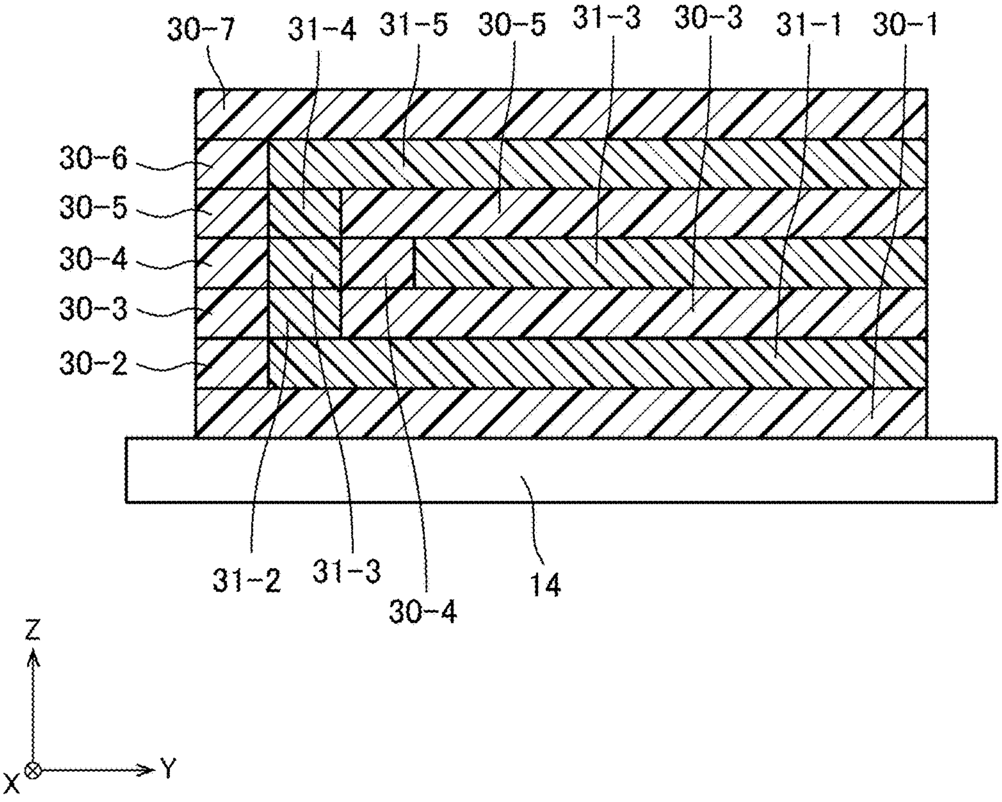

[Figure 4N]
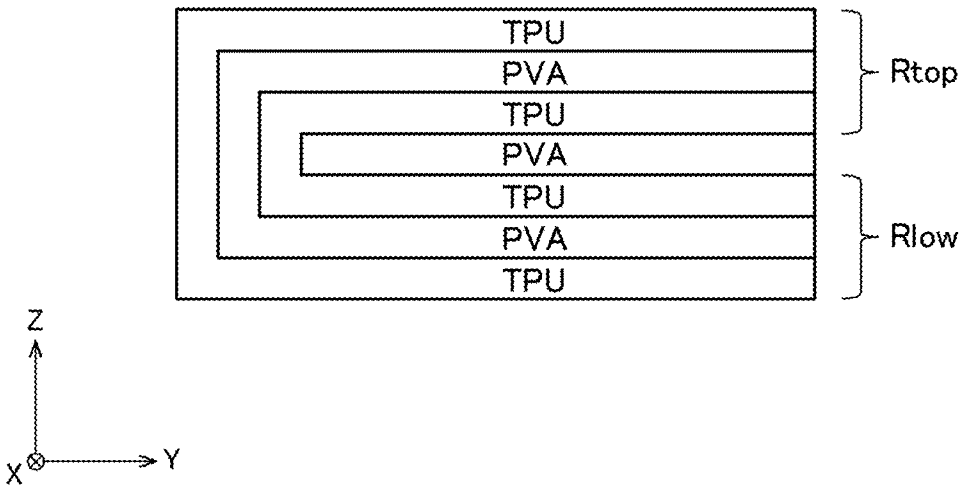
[Figure 4O]
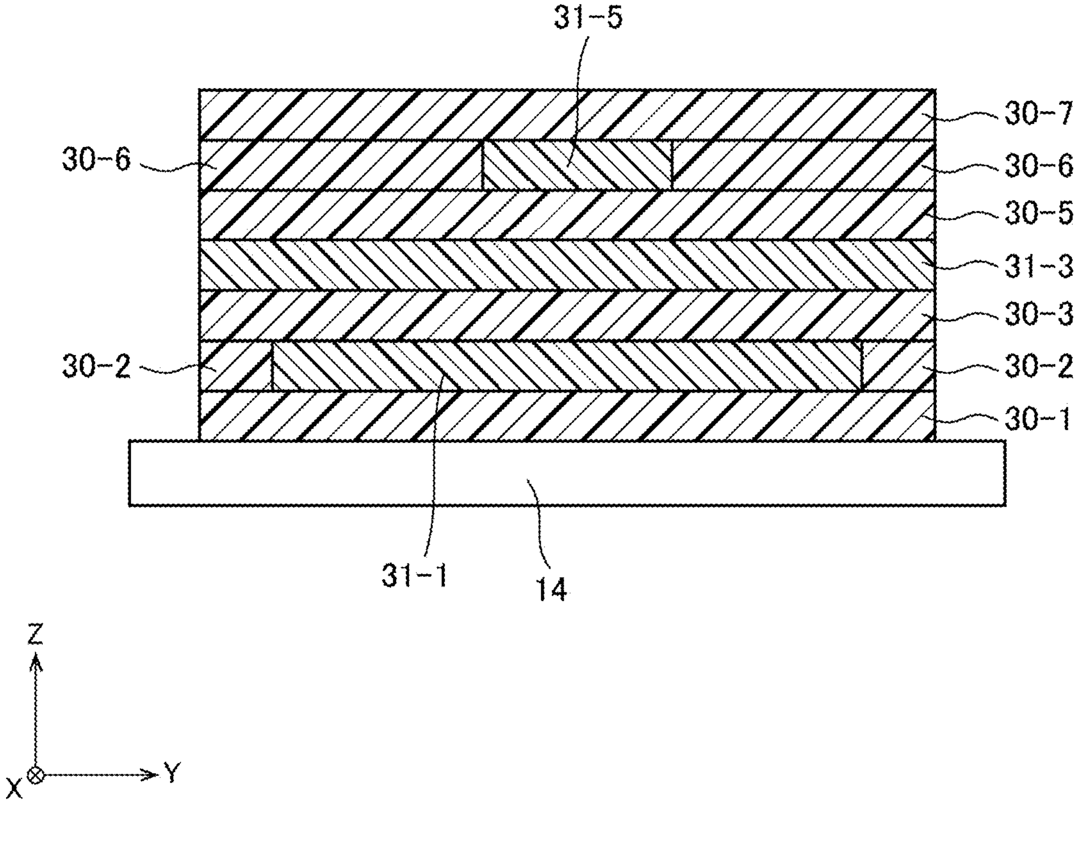

[Figure 4P]
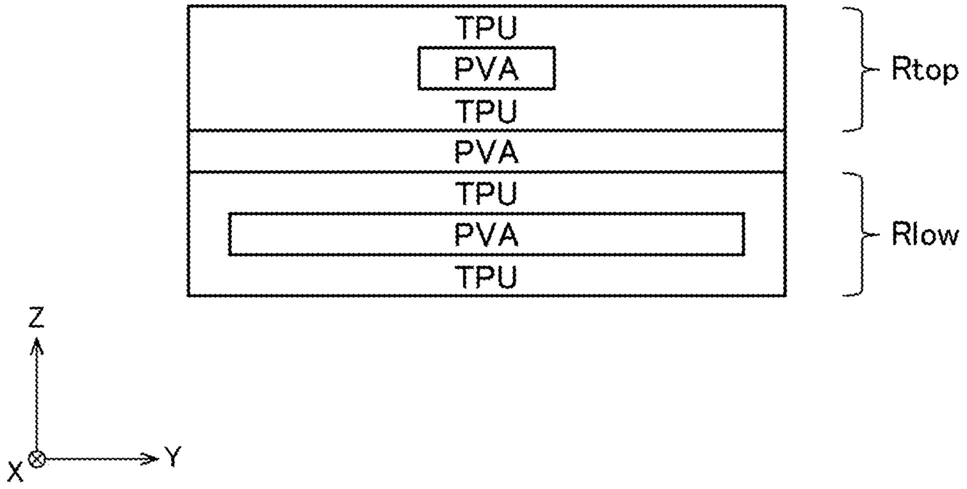
[Figure 4Q]
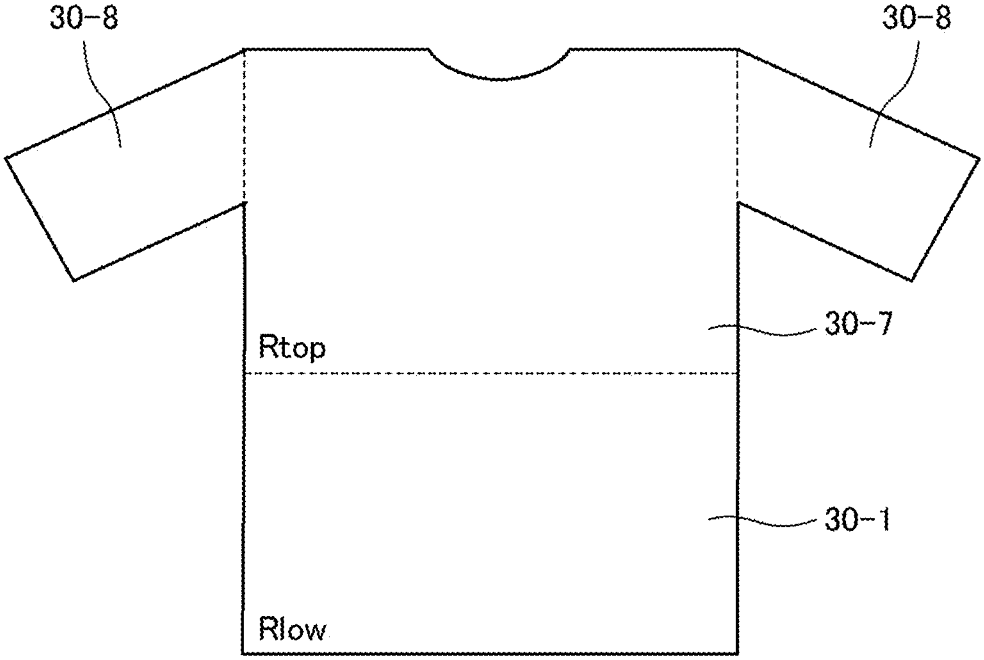

[Figure 5A]
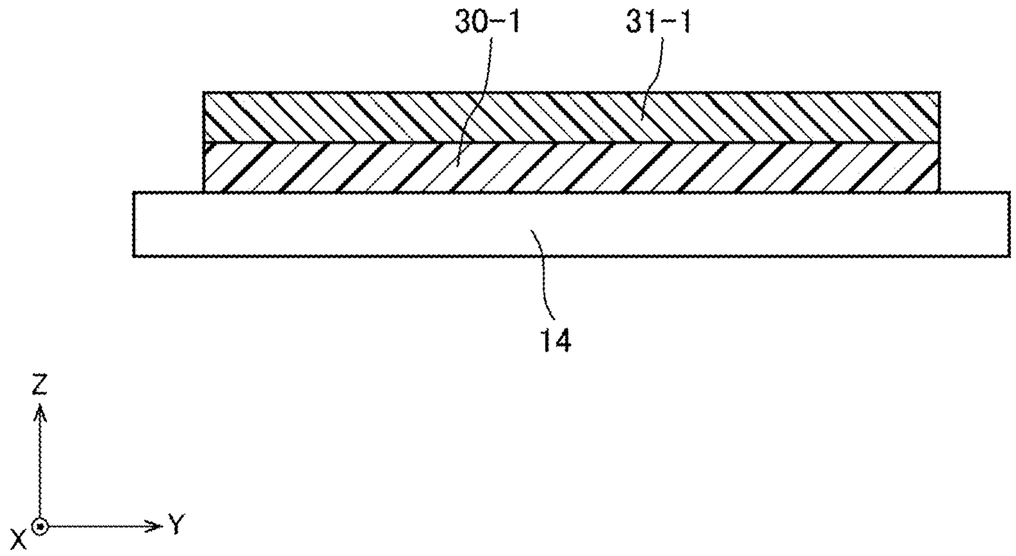
[Figure 5B]
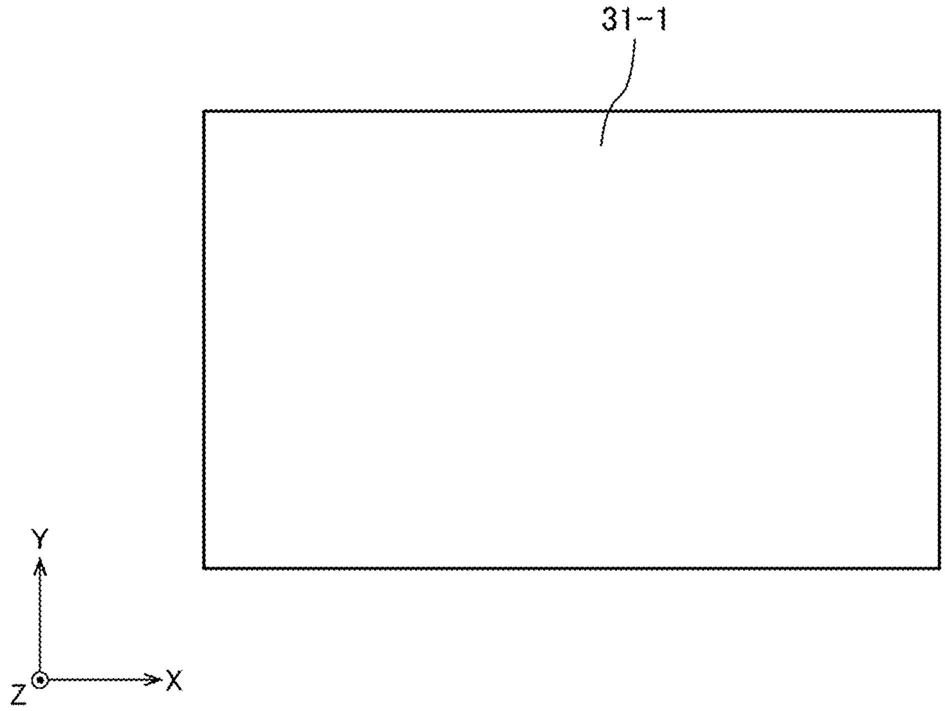

[Figure 5C]
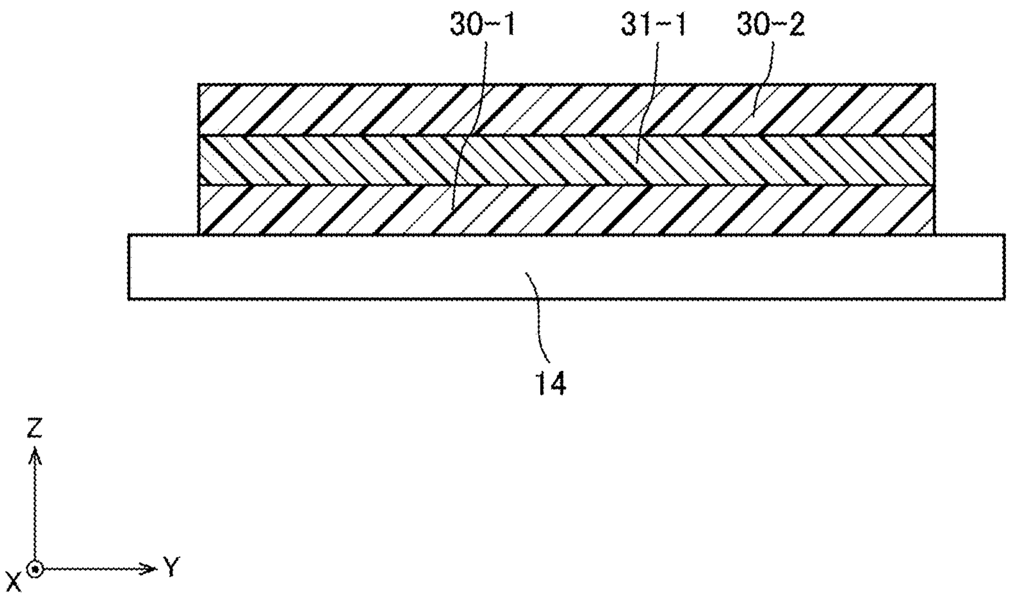
[Figure 5D]
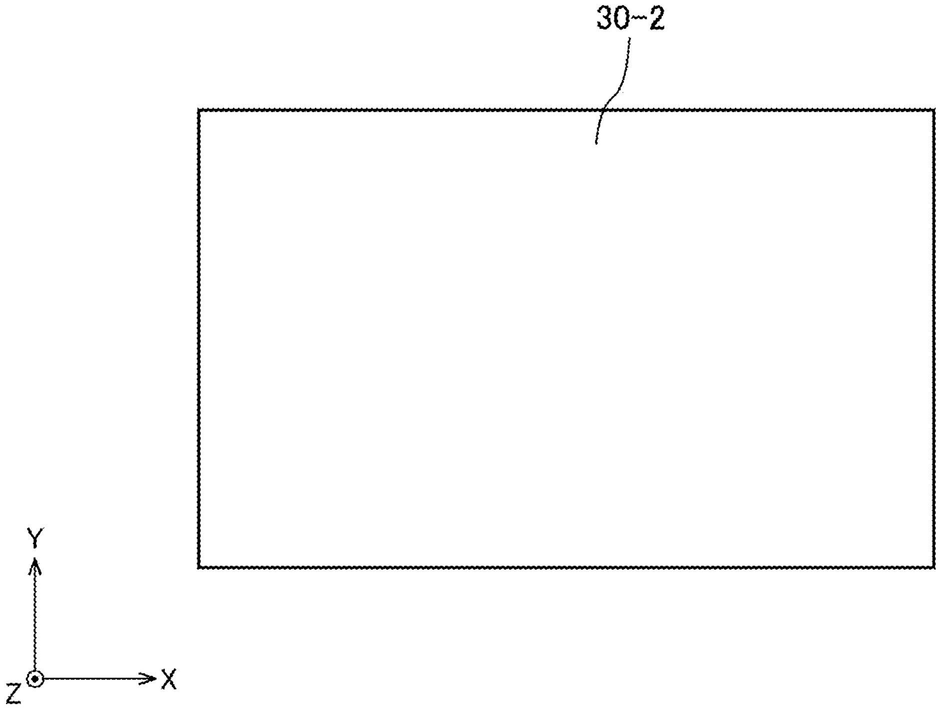

[Figure 5E]
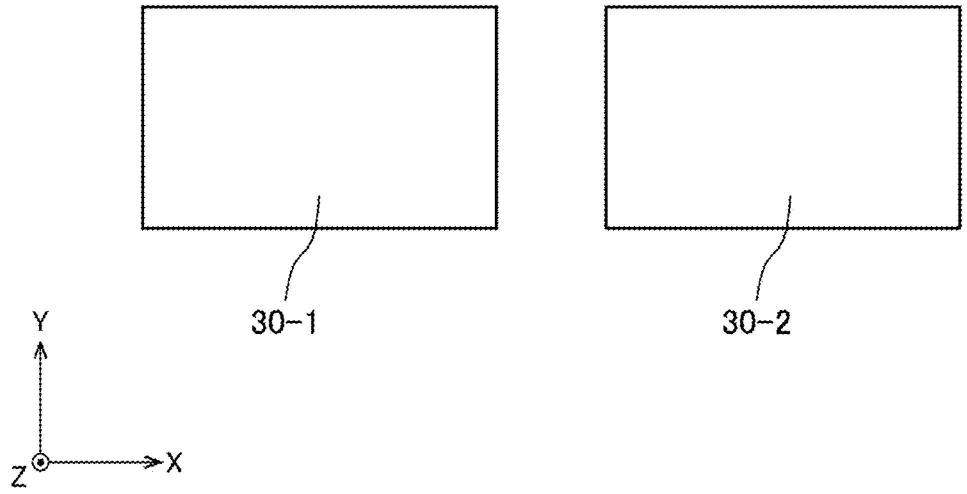
[Figure 6A]
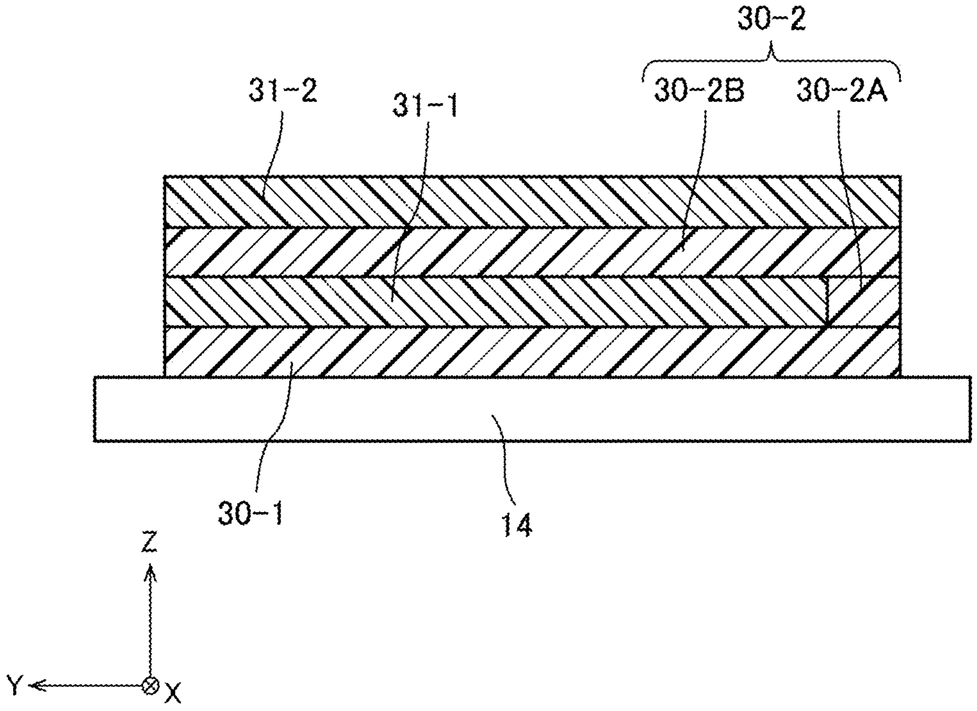

[Figure 6B]
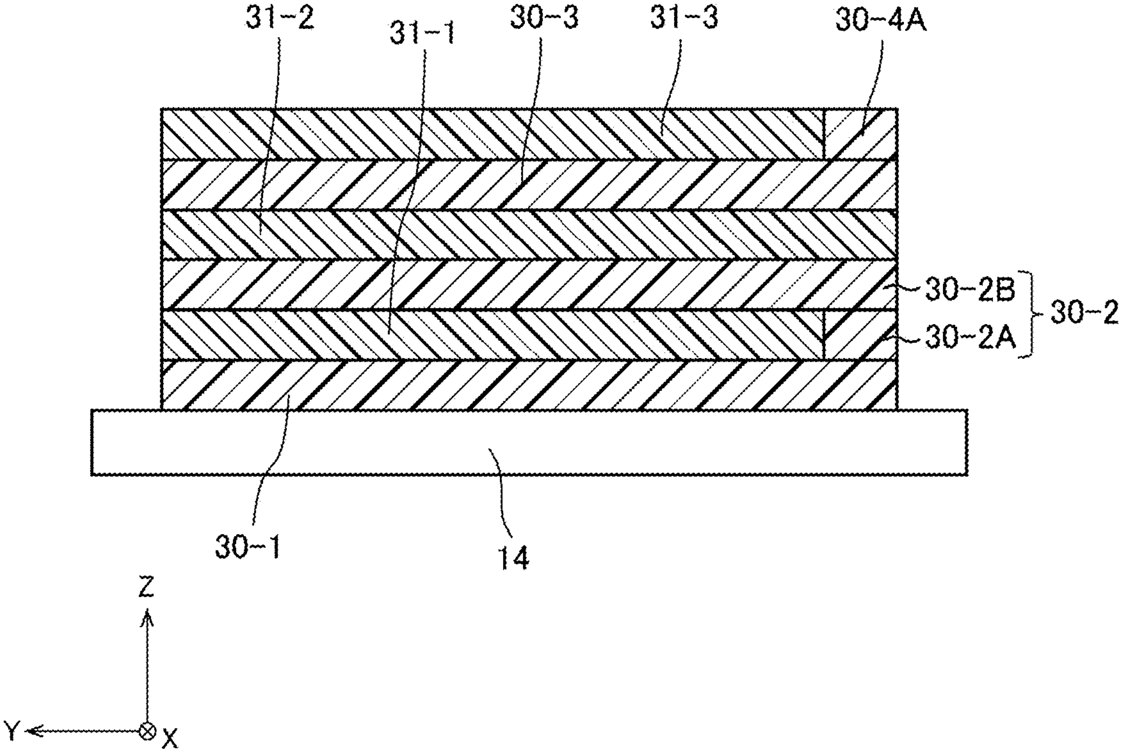
[Figure 6C]
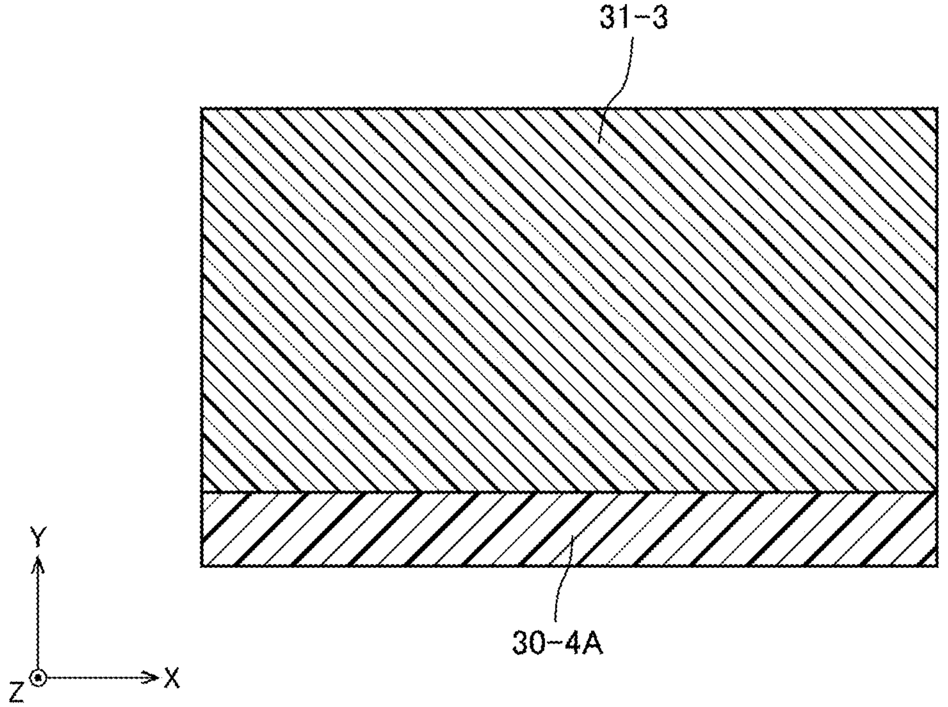

[Figure 6D]
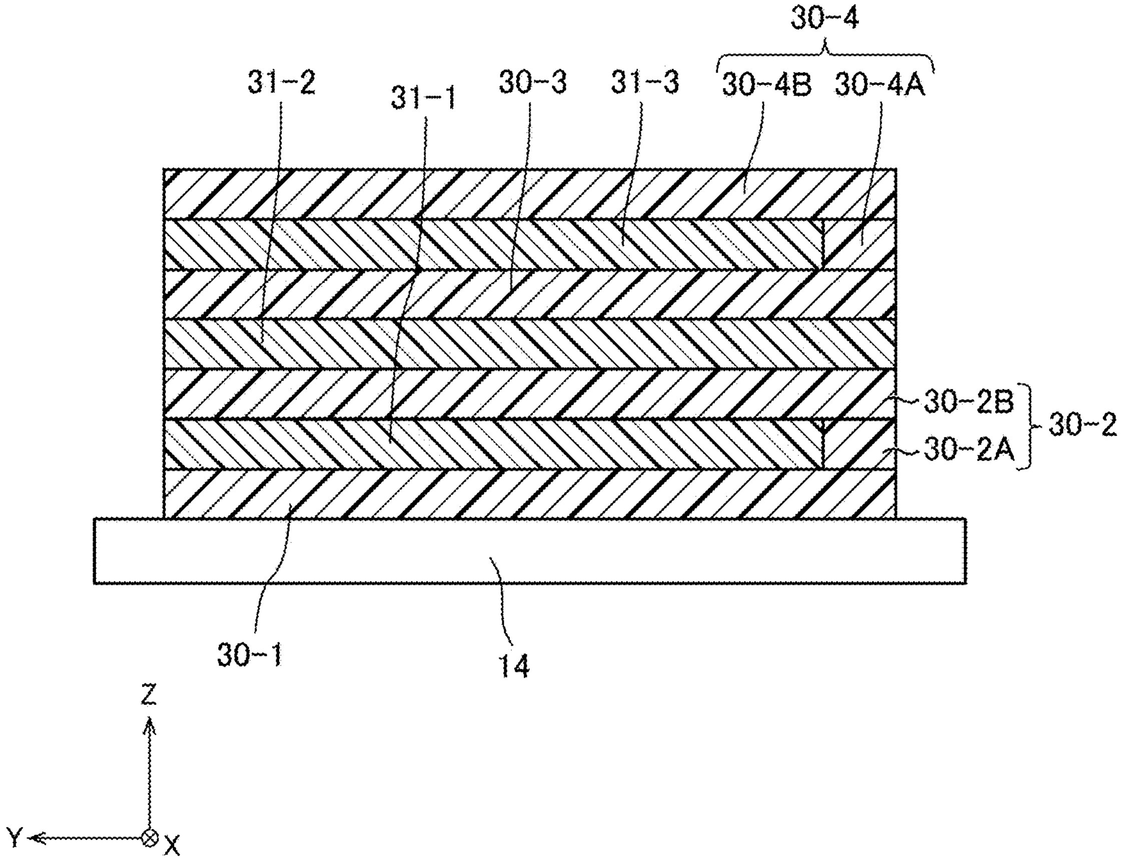
[Figure 7]
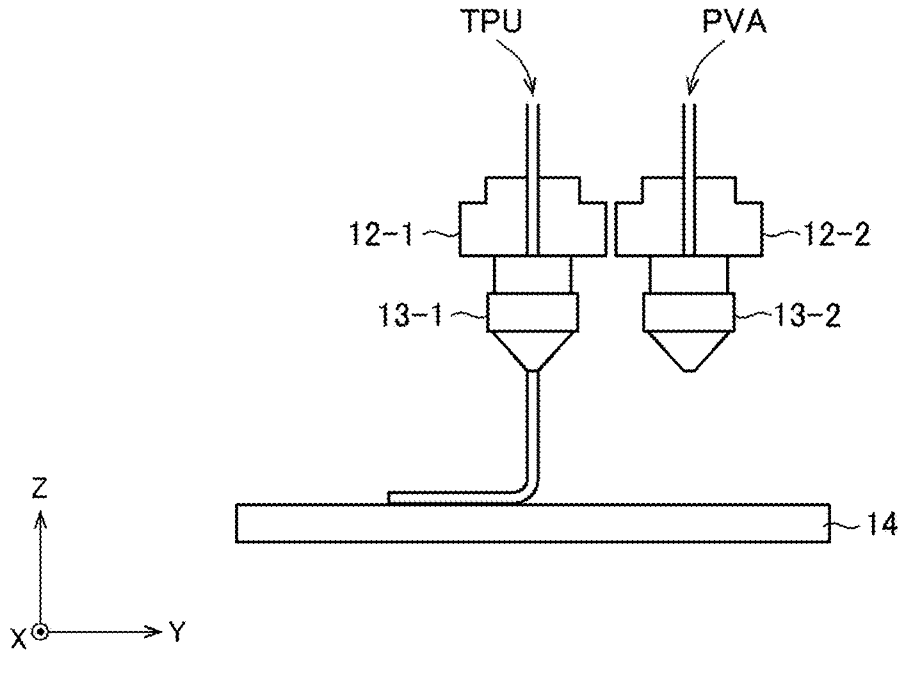

[Figure 8A]
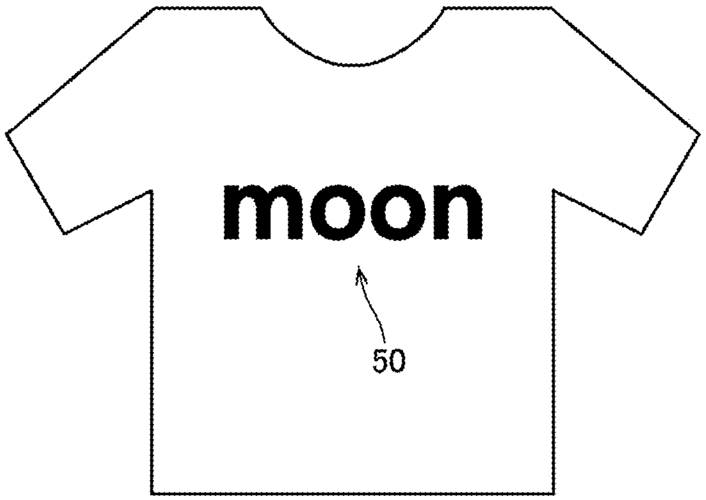
[Figure 8B]
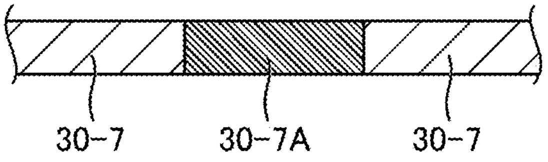
[Figure 8C]
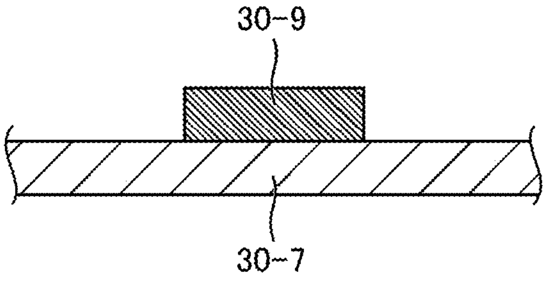

[Figure 9A]
[Figure 9B]
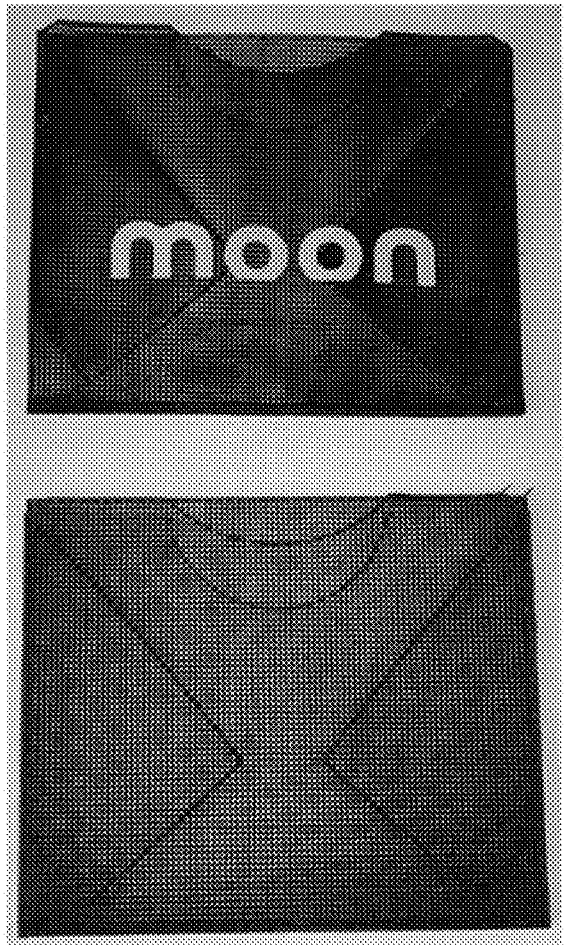

[Figure 9C]
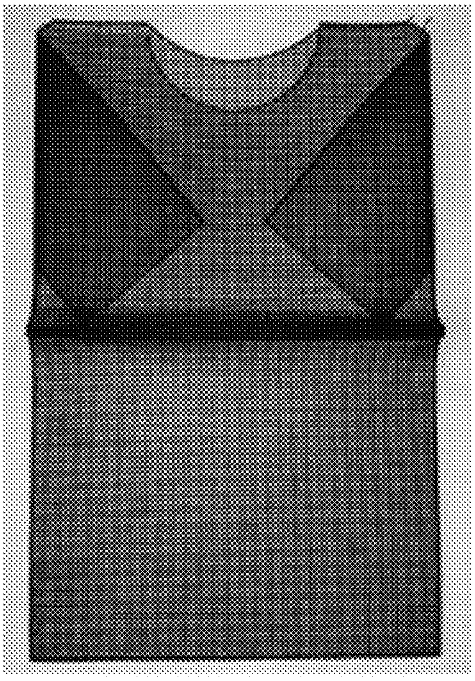
[Figure 9D]
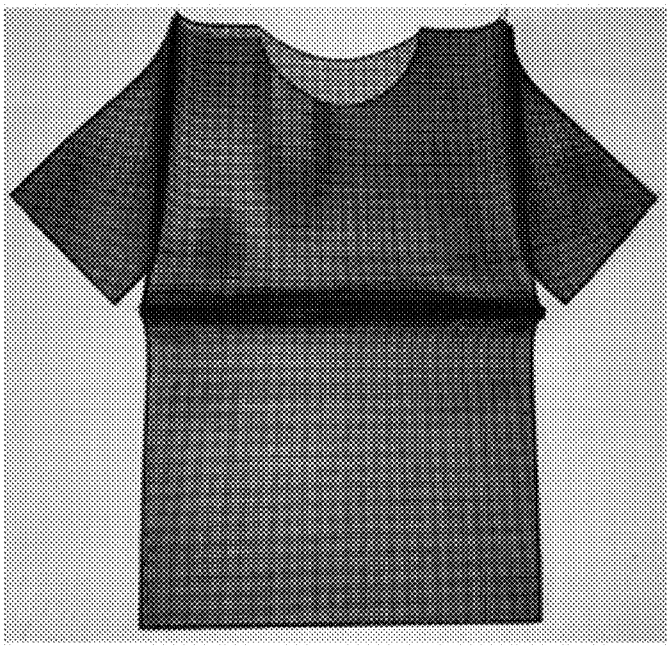

[Figure 9E]
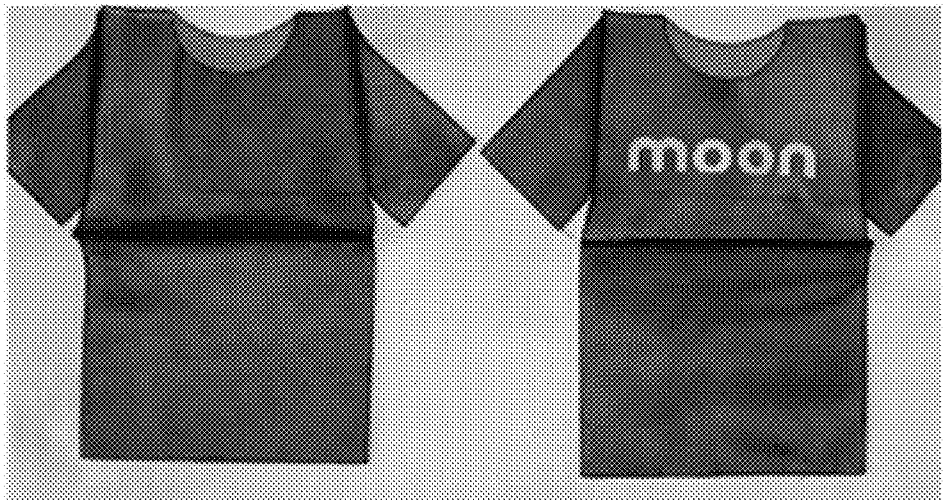

ARTICLE AND METHOD FOR MANUFACTURING THE ARTICLE

TECHNICAL FIELD

Embodiments of the present invention relate to an article and a method for manufacturing the article. This application is based upon and claims the benefit of priority from Japanese Patent Application No. 2021-110402 filed on Jul. 1, 2021, which is incorporated by reference herein.

BACKGROUND TECHNOLOGY

In non-patent document 1, a method for manufacturing a garment is disclosed. According to this method, a garment is manufactured, for example by cutting a front portion, a back portion, and sleeve portions of a garment respectively, and by sewing them together. And, a cutting and a sewing of a garment is performed by human hands.

PRIOR ART DOCUMENTS

Non-Patent Documents

Non-Patent Document 1: "Fabric Cutting Process in a Typical Bangladeshi Garment Factory", www.youtube.com/watch?app=desktop&v=CWpbfn93Lyw

SUMMARY OF INVENTION

Problem to be Solved by the Invention

One embodiment of the present invention provides an article that can be manufactured easily by using a 3D printer and a method for manufacturing the article.

Means for Solving the Problem

A method for manufacturing an article relating to one embodiment of the present invention is a method for manufacturing an article by using a 3D printer, comprising: printing a first resin layer by using the 3D printer; printing a second resin layer on the first resin layer using a material different from a material of the first resin layer by using the 3D printer; printing a third resin layer on the second resin layer using a material different from a material of the second resin layer by using the 3D printer, wherein the first resin layer is in contact with the third resin layer in a partial region of the first resin layer, the first resin layer and the third resin layer are composed of a water-insoluble material, the second resin layer is composed of a water-soluble material, and a single article is formed by the first resin layer and the third resin layer.

BRIEF DESCRIPTION OF THE DRAWINGS

FIG. 1 is a conceptual diagram illustrating a structure of a 3D printer relating to a first embodiment.

FIG. 2A is a perspective view illustrating a first step of a method for manufacturing an article relating to a first embodiment.

FIG. 2B is a perspective view illustrating a second step of a method for manufacturing an article relating to a first embodiment.

FIG. 2C is a perspective view illustrating a third step of a method for manufacturing an article relating to a first embodiment.

FIG. 2D is a perspective view illustrating a fourth step of a method for manufacturing an article relating to a first embodiment.

FIG. 2E is a perspective view illustrating a fifth step of a method for manufacturing an article relating to a first embodiment.

FIG. 2F is a perspective view illustrating a sixth step of a method for manufacturing an article relating to a first embodiment.

FIG. 2G is a perspective view illustrating a first step of a printing method relating to a variant of a first embodiment.

FIG. 2H is a perspective view illustrating a second step of a printing method relating to a variant of a first embodiment.

FIG. 3 is a diagram illustrating a characteristic of a filament relating to a first embodiment.

FIG. 4A is a cross-sectional view illustrating a first step of a method for manufacturing an article relating to a second embodiment.

FIG. 4B is a top view illustrating a first step of a method for manufacturing an article relating to a second embodiment.

FIG. 4C is a cross-sectional view illustrating a second step of a method for manufacturing an article relating to a second embodiment.

FIG. 4D is a top view illustrating a second step of a method for manufacturing an article relating to a second embodiment.

FIG. 4E is a cross-sectional view illustrating a third step of a method for manufacturing an article relating to a second embodiment.

FIG. 4F is a top view illustrating a third step of a method for manufacturing an article relating to a second embodiment.

FIG. 4G is a cross-sectional view illustrating a fourth step of a method for manufacturing an article relating to a second embodiment.

FIG. 4H is a top view illustrating a fourth step of a method for manufacturing an article relating to a second embodiment.

FIG. 4I is a cross-sectional view illustrating a fifth step of a method for manufacturing an article relating to a second embodiment.

FIG. 4J is a top view illustrating a fifth step of a method for manufacturing an article relating to a second embodiment.

FIG. 4K is a cross-sectional view illustrating a sixth step of a method for manufacturing an article relating to a second embodiment.

FIG. 4L is a top view illustrating a sixth step of a method for manufacturing an article relating to a second embodiment.

FIG. 4M is a cross-sectional view illustrating a seventh step of a method for manufacturing an article relating to a second embodiment.

FIG. 4N is a cross-sectional view illustrating a seventh step of a method for manufacturing an article relating to a second embodiment.

FIG. 4O is a cross-sectional view illustrating a seventh step of a method for manufacturing an article relating to a second embodiment.

FIG. 4P is a cross-sectional view illustrating a seventh step of a method for manufacturing an article relating to a second embodiment.

FIG. 4Q is a front view of a garment manufactured by a method for manufacturing an article relating to a second embodiment.

FIG. 5A is a cross-sectional view illustrating a first step of a method for manufacturing articles relating to a third embodiment.

FIG. 5B is a top view illustrating a first step of a method for manufacturing articles relating to a third embodiment.

FIG. 5C is a cross-sectional view illustrating a second step of a method for manufacturing articles relating to a third embodiment.

FIG. 5D is a top view illustrating a second step of a method for manufacturing articles relating to a third embodiment.

FIG. 5E is a top view of articles manufactured by a method for manufacturing articles relating to a third embodiment.

FIG. 6A is a cross-sectional view illustrating a first step of a method for manufacturing articles relating to a variant of a third embodiment.

FIG. 6B is a cross-sectional view illustrating a second step of a method for manufacturing articles relating to a variant of a third embodiment.

FIG. 6C is a top view illustrating a second step of a method for manufacturing articles relating to a variant of a third embodiment.

FIG. 6D is a cross-sectional view illustrating a third step of a method for manufacturing articles relating to a variant of a third embodiment.

FIG. 7 is a conceptual diagram illustrating a structure of a nozzle portion of a 3D printer relating to a variant of first to third embodiments.

FIG. 8A is a front view of a garment manufactured by a method for manufacturing an article relating to a second embodiment.

FIG. 8B is a cross-sectional view of a garment illustrated in FIG. 8A.

FIG. 8C is a cross-sectional view of a garment illustrated in FIG. 8B.

FIG. 9A is a photograph of a T-shirt manufactured by a method for manufacturing an article relating to first to third embodiments.

FIG. 9B is a photograph of a T-shirt manufactured by a method for manufacturing an article relating to first to third embodiments.

FIG. 9C is a photograph of a T-shirt manufactured by a method for manufacturing an article relating to first to third embodiments.

FIG. 9D is a photograph of a T-shirt manufactured by a method for manufacturing an article relating to first to third embodiments.

FIG. 9E is a photograph of a T-shirt manufactured by a method for manufacturing an article relating to first to third embodiments.

MODE FOR CARRYING OUT THE INVENTION

Hereinafter, explaining about embodiments of the present invention by referring to the drawings. In addition, with respect to drawings, same or equivalent elements shall be given same reference numbers, and overlapping explanations shall be omitted.

A method for manufacturing an article relating to an embodiment explained in this specification uses a 3D printer to print a layer using a resin as a material in a bended pattern, and then, spreads out a bended portion to be able to manufacture a larger article by using a small-sized 3D printer. Also, a garment relating to an embodiment explained in this specification is explained as an example of an article manufactured by this manufacturing method. Further, a method for manufacturing an article relating to an embodiment explained in this specification is able to manufacture many articles at high speed, by printing a plurality of resin layers successively by using a 3D printer. In addition, in below, a second embodiment is explained, for example by using a garment (T-shirt) as a concrete example of an article, but an article is not limited particularly, and it may be a shirt, a blouse, pants, a skirt, a dress, a scarf, gloves, a belt, a broach, earrings, neckless, pierced earrings, and other accessories, pumps, high heels, men's shoes, boots, sandals, and other shoes, or fashion glasses and other fashion goods, or it may be a protection case for a smart phone or a case for writing implements, and it may be any article.

First Embodiment

At first, explaining about an article relating to a first embodiment and a method for manufacturing the article. The present embodiment relates to a method for manufacturing an article with larger size by printing resin layers having a bended pattern using a 3D printer.

FIG. 1 is a conceptual diagram illustrating a structure of a 3D printer relating to a first embodiment. A 3D printer relating to the present embodiment is a FDM (Fused Deposition Modeling) type printer, and also known as a FFF (Fused Filament Fabrication) type. As illustrated, a 3D printer 10 comprises a gear portion 11, a heater 12, a nozzle 13, and a plate 14. And, for example by a filament spool 20 arranged at outside of the 3D printer, a filament 21 to be a printing material for manufacturing an article is supplied to the 3D printer. In the present embodiment, a resin can be used as the filament 21. A type of this resin will be explained later.

The gear portion 11 sends the filament 21 supplied from the filament spool 20 to the heater 12, for example by a mechanism such as a gear comprised in an inside of the gear portion 11. The heater 12 heats the filament 21 until a temperature that the solid filament 21 will be in a melted state. The nozzle 13 deposits the filament 21 melted by the heater 12 on the plate 14. At this time, the nozzle 13 (and the heater 12 and the gear portion 11) is freely movable in a lateral direction (defined as Y axis) or in a depth direction (defined as X axis) in a space described in FIG. 1. As such, the nozzle 13 moves in a XY plane and deposits the filament 21 on the plate 14, so a resin layer 22 in a shape expected by a user will be printed on the plate 14. The plate 14 is movable, for example along a direction perpendicular to a XY plane (defined as Z axis), and in this way, a distance between the nozzle 13 and the plate 14 can be adjusted. In addition, a structure of the 3D printer 10 illustrated in FIG. 1 is only an example, and it is only illustrating a minimum required structure, so it may be other 3D printers.

Next, explaining about an idea of a method for manufacturing an article using the 3D printer 10 explained in FIG. 1 by using FIGS. 2A to 2F. FIGS. 2A to 2F are sequentially illustrating a method for manufacturing an article relating to the present embodiment.

At first, as illustrated in FIGS. 2A to 2C, a resin layer is printed on the plate 14 by using the filament 21 by the 3D printer 10. FIGS. 2A to 2C are perspective views of a structure body printed on the plate 14 by the filament 21. At first, as illustrated in FIG. 2A, a resin layer 30-1 (for example, a first resin layer) is printed on the plate 14. In the resin layer 30-1, for example a TPU (Thermoplastic Polyurethane) is used as the filament 21. A printing condition of the resin layer 30-1 can be selected accordingly. As an example, the heater 12 of the 3D printer 10 heats the TPU, for example to 200 degrees Celsius. In addition, a diameter of the nozzle 13 of the 3D printer 10 is for example 0.4 mm, and the heated TPU will be printed in a thickness of for example 0.4 mm. In other words, the nozzle 13 prints the TPU with a width and a thickness of 0.4 mm linearly for example along a Y direction, and then, the nozzle 13 moves in a X direction and prints the TPU with a width and a thickness of 0.4 mm linearly along a Y direction again, and by repeating this movement, a planar resin layer 30-1 as illustrated in FIG. 2A is formed. In addition, a nozzle size and a width and a thickness of the printed TPU is not necessarily 0.4 mm, and for example, it may be in a range of 0.1 mm to 0.8 mm. In addition, the resin layer 30-1 may be formed by printing the TPU in a lattice shape. In other words, the resin layer 30-1 may be formed with a lattice-shaped cavities, by printing the TPU in a X direction and in a Y direction with a certain space. These printing conditions are same with respect to the following second embodiment and after.

As illustrated in FIG. 2B, a resin layer 31-1 (for example, a second resin layer) is printed on the resin layer 30-1. In the resin layer 31-1, for example a PVA (Polyvinyl Alcohol) is used as the filament 21. Printing conditions of the PVA may be same as the printing conditions of the TPU, or it may be different according to need. For example, in the present example, the heater 12 of the 3D printer 10 heats the PVA for example to 190 degrees Celsius which is lower than a temperature at the time of a printing of the TPU. In addition, as illustrated in FIG. 2B, the resin layer 31-1 is printed such that an end region 30A of the resin layer 30-1 in a Y axis direction will be exposed. By printing the melted PVA on the resin layer 30-1, the resin layer 31-1 is adhered to the resin layer 30-1. Next, as illustrated in FIG. 2C, a resin layer 30-2 (for example, a third resin layer) is printed on the resin layer 31-1 and on the end region 30A of the resin layer 30-1. In the resin layer 30-2, a TPU is used as the filament 21. Also, in this case, the resin layer 30-2 is adhered to the resin layer 31-1, by printing the melted TPU on the resin layer 31-1. Same applies to the following embodiments. Also, in the present specification, regardless of a number with a hyphen in reference numbers, a member described as "resin layer 30" is printed by using a TPU as a material, and a member described as "resin layer 31" is printed by using a PVA as a material.

Then, as illustrated in FIG. 2D, a structure body formed by the resin layers 30-1, 31-1, and 30-2 is impregnated for example in a hot water 40. The hot water 40 is for example 90 degrees Celsius or more. Then, the resin layer 31-1 melts by the hot water 40. In addition, a temperature of the hot water 40 is not always limited to 90 degrees Celsius or more, and it is not limited particularly as long as it is a temperature, for example which can melt the resin layer 31-1 while the resin layers 30-1 and 30-2 remain. Also, it is not limited to a water, and any liquid capable of melting the resin layer 31-1 can be used. Even with a liquid other than a water, the resin layer 31-1 can be melted or partly melted. For example, acetamide, dimethyl formamide (DMF), dimethyl siloxane (DMSO), formamide, glycerol, glycol, HMTP (Hexamethoxytriphenylene), piperazine, triethylenediamine, and like can be used, and then, it may be washed by other solvent according to need. This process may be performed for example by human hands, or it may be performed by the 3D printer 10 or other manufacturing devices. As a result, a structure body 100 as illustrated in FIG. 2E is formed. FIG. 2E is a perspective view of the structure body 100 viewed in a YZ plane. As illustrated, the structure body 100 is having a structure that the resin layer 30-1 and a partial region of the resin layer 30-2 are opposed parallelly and spaced apart to each other, and the end region of the resin layer 30-2 is connected to the resin layer 30-1. In other words, the structure body 100 is having a shape that it is bent in its approximate center in a YZ plane. Then, as illustrated in FIG. 2F, for example, the resin layer 30-2 is spread out in an arrow direction in the drawing in a YZ plane. In this way, a rectangular structure body (article) 100 with a size of about twice as large as the resin layer 30-1 or the resin layer 30-2 is completed. In addition, in a structure after spreading out the resin layer 30-2, a protrusion for example in a Z axis direction is formed at a connection 30B between the resin layers 30-1 and 30-2. In addition, the protrusion is formed when it is spread out, but it is desirable to use the protrusion as a design of the article. Concretely, for example, it may be configured to arrange a position of the protrusion according to a position of a design of the article.

In addition, in an example of FIG. 2A to FIG. 2C, it is illustrated about a case that three layers of resin layer are printed, and also, it is explained about a case that it is printed per a lump of member. However, it may be printed per layer and not per member. Explaining about such example by using FIG. 2G and FIG. 2H. FIG. 2G and FIG. 2H are corresponding to processes illustrated in FIG. 2B and FIG. 2C, and illustrating the processes when resin layers 31-1 and 30-2 are formed per layer viewed in a YZ plane.

As explained in FIG. 2A, after the resin layer 30-1 (resin layer of first layer) is printed, as illustrated in FIG. 2G, resin layers 31-1 and 30-2A (resin layer of second layer) are printed on the resin layer 30-1. The resin layer 30-2A is printed on a region corresponding to the end region 30A explained in FIG. 2B. Then, a resin layer 30-2B (resin layer of third layer) is printed on the resin layers 31-1 and 30-2A. As a result, the resin layer 30-2 explained in FIG. 2C is completed by the resin layers 30-2A and 30-2B. In other words, the resin layer 30-2A corresponds to a region connecting one half region (resin layer 30-1) and other half region (resin layer 30-2B) of the completed article.

In this way, a printing by the 3D printer may be performed per certain member, or may be performed per layer. In addition, in below, explaining about an example when a resin is printed per layer.

In addition, TPU and PVA which will be materials for manufacturing the article may be affected by a moisture, so for example before beginning a 3D printing as illustrated in FIG. 2A, and after an end of a 3D printing, it is preferable to be maintained in a dry state. In other words, TPU used as a material of the resin layer 30 is a type of a plastic which can be generated by a polyaddition reaction occurs between di-isocyanate and one or more types of diols. And, it can be used as a flexible engineering plastic or as a hard rubber. Also, TPU is a thermoplastic material having a flexibility and a wear resistance, is resistant to wear and shock, and is resistant to various chemicals. Also, TPU is used as a material of the resin layer 31 and TPU is water-insoluble, but PVA is water-soluble.

TPU is generally having a moisture-absorbing performance, that is a property to absorb a moisture in an atmosphere. A moisture-absorbing property generally affects many thermoplastic plastic materials, and it may be an obstacle for a 3D printing. For example, even when a humidity in a 3D printing environment was relatively low, a trace moisture may damage a plastic, and as a result, an inherent property of plastic may not be exerted. Therefore, in order to make an article to be manufactured relating to the present embodiment as a high-quality article, it is preferable to store TPU (and also PVA) always in a dry state. FIG. 3 is a graph illustrating a change of a water content of TPU with respect to a lapse of time.

In FIG. 3, a property of TPU in two environments are illustrated. In the drawing, CASE I is illustrating an environment of high temperature and high humidity with a temperature of 40 degrees Celsius and a humidity of 92%, and CASE II is illustrating an average environment with a temperature of 23 degrees Celsius and a humidity of 50%. As illustrated, for example in CASE II, a water content is about 0.18% to 0.28% even after being left for about 8 hours, but in CASE I, a water content is about 0.45% to 0.75% only after being left for about 2 hours. According to a grade of TPU, a water content may be 1% or more, so it may be disadvantageous when processed at high temperature. Thus, an environment to perform a 3D printing is preferably an environment of low temperature and low humidity, and TPU to be the filament 21 is preferably dried. Also regarding PVA, it is also preferable that an environment for 3D printing is low temperature and low humidity and that it is dried to be the filament 21.

PVA used as a material of the resin layer 31 is polyvinyl alcohol (PVOH or PVAL), and it is a water-soluble synthetic polymer. PVA is suitable for a creation of a membrane or an emulsification, and it is a material having an adhesiveness. Also, it is odorless and nontoxic, and it is resistant to oils, fats, and various solvents.

PVA is a flexible biodegradable polymer which is apt to be influenced by a humidity. PVA dissolves by exposing to a moisture. Therefore, in the present embodiment, it is used as a supporting member of a structure body to be printed by TPU. As PVA easily react to a moisture, PVA as the filament 21 is preferably stored in a vessel with sufficiently low humidity. Also, when PVA already contained excess amount of moisture, it may be dried for few hours by using a commercially available dryer or oven, for example by setting a temperature to a minimum temperature. In this way, a moisture can be removed without dissolving PVA. Also, when a 3D printing has to be performed in an environment with high temperature and high humidity, a previously printed PVA may start to melt during a printing of each layer. Thus, in such environment, it is preferable to decrease a number of layers to be printed compared to which in an environment with low temperature and low humidity, and to remove PVA quickly.

As the above, TPU is insoluble to water, and for example having a water-insoluble property equal to nylon, polyester, polyethylene and the like. These polymers may absorb different amount of water according to an affinity to a water, that is a "hydrophilicity" (it absorbs, but does not dissolve). A general water absorbing rate of TPU is about 1.5%, but nylon tends to absorb more water, and a water absorbing rate may reach 3.5% according to a quality. Thus, it is desirable to dry it before processing a plastic.

A point to be considered is "a hydrolysis" which is a decomposition reaction occurred by an existence of a water or a water vapor. At this point, an ester-based TPU may increase a hydrolysis or an absorbing property by a hot water, but an ether-based TPU may be stable for many years even by a hot water. Thus, a polyester-based TPU may be used.

As the above, according to a method relating to the present embodiment, a large-sized article can be manufactured without using a large-sized 3D printer. In other words, as explained in FIG. 2A to FIG. 2E, an article to be manufactured is printed in a bended shape by the 3D printer 10 (refer to FIG. 2C). Then, PVA (resin layer 31-1) as a supporting member is removed, and as illustrated in FIG. 2F, by spreading out a bended structure body, an article having a final shape is completed. Therefore, in an example of FIG. 2A to FIG. 2F, an article with a maximum length in a X axis direction or a Y axis direction twice as a length in a X axis direction or a Y axis direction of the plate 14 can be manufactured. In other words, in a FDM type 3D printer, a size of a manufacturable article is generally limited to be equal to or less than an area of the plate 14, and a 3D printer for household use has relatively small size. Therefore, a size of a manufacturable article is limited to a certain extent. However, according to the present embodiment, it is possible to manufacture an article with a size larger than the plate 14. According to the present embodiment, a large-sized article can be printed even by a 3D printer for household use which is relatively inexpensive. In addition, in the above, it is explained about a case that a length in a X axis direction or in a Y axis direction will be approximately twice as large as a size of the plate 14, but it is possible to manufacture an article with a size approximately twice as large in both of a X axis direction and a Y axis direction (four times in an area ratio), by printing in a shape that it is folded in both of a X axis direction and a Y axis direction.

Also, according to a manufacturing method relating to the present embodiment, for example, resin layers 30-1 and 30-2 are formed as an integral object. In other words, by printing using TPU in a liquid state by heated to high temperature, the resin layers 30-1 and 30-2 are adhered in a part that they contact with each other on the plate 14. Therefore, an operation of bonding or stitching between the resin layers 30-1 and 30-2 is not necessary. Further, an article to be manufactured is formed by TPU, by using a water-insoluble TPU and a water-soluble PVA as materials. As a result, after an end of printing by the 3D printer 10, an unnecessary member (resin layer 31-1 formed by PVA) can be removed only by impregnating in a hot water, as explained in FIG. 2D. Therefore, a large article can be manufactured in a very easy manner. In addition, in FIG. 2A to FIG. 2C, it is explained about an example that two layers of resin layers 30-1 and 30-2 are printed. However, for example three layers of resin layers 30 may be printed. In other words, after FIG. 2C, a second resin layer 31-2 using PVA is printed on the resin layer 30-2, and at this time, a region that a second resin layer 30-2 is exposed will be remained in a region opposite to the end region 30A in a Y axis direction. And, a third resin layer 30-3 is printed on the second resin layer 31-2 such that the third resin layer 30-3 contacts this region of the second resin layer 30-2. Then, the resin layers 31-1 and 31-2 are dissolved, and by spreading out the remaining resin layers 30-1, 30-2, and 30-3, an article with a size, for example approximately three times a length of the plate 14 in a Y axis direction can be manufactured. Of course, resin layers 30 is not limited to two layers or three layers, and more layers may be arranged.

Second Embodiment

Next, explaining about an article relating to a second embodiment and a method for manufacturing the article. The present embodiment relates to a method for manufacturing a garment, especially a T-shirt, by using the method explained in the first embodiment. A printing conditions using TPU and PVA are as explained in the first embodiment, and in below, only explaining about points different from the first embodiment by using FIG. 4A to FIG. 4Q. FIG. 4A, FIG. 4C, FIG. 4E, FIG. 4G, FIG. 4I, FIG. 4K, FIG. 4M to FIG. 4P are respectively cross-sectional views sequentially illustrating a structure body printed on the plate 14 (structure viewed in a YZ plane), FIG. 4B, FIG. 4D, FIG. 4F, FIG. 4H, FIG. 4J, and FIG. 4L are respectively top views of a structure body obtained in a process of FIG. 4A, FIG. 4C, FIG. 4E, FIG. 4G, FIG. 4I, FIG. 4K (structure viewed in a XY plane), and FIG. 4Q is a front view of a completed T-shirt (structure viewed in a XY plane). In addition, a cross-sectional view in a YZ plane is illustrating a structure viewed, for example along a Y axis direction at a place corresponding to a center part in a X axis of a structure body in a corresponding plan view.

At first, as illustrated in FIG. 4A and FIG. 4B, a first resin layer is printed. In other words, at first, a resin layer 30-1 is printed by using TPU as a filament. The resin layer 30-1 corresponds to a front lower half region of a completed T-shirt, and for example printed in a rectangular shape. Further, as illustrated in FIG. 4C and FIG. 4D, a second resin layer is printed. In other words, a resin layer 31-1 is printed on the resin layer 30-1 by using PVA as a filament, and a resin layer 30-2 is printed on the resin layer 30-1 by using TPU as a filament. The resin layer 31-1 corresponds to a cavity for passing through a body (trunk) of a wearer wearing a T-shirt, in a lower half region of a completed T-shirt. Also, the resin layer 30-2 corresponds to a part connecting a front lower half region and a front upper half region of a completed T-shirt, and it can be said that it is a region corresponding to the resin layer 30-2A explained in FIG. 2H of the first embodiment. Therefore, the resin layer 31-1 is printed in a size smaller than the resin layer 30-1 such that both end portions of the resin layer 30-1 in a X axis direction and one end portion of the resin layer 30-1 in a Y axis direction will be exposed. Also, the resin layer 30-2 is printed on the resin layer 30-1 along a Y axis direction at both end regions in a X axis direction, and printed on the resin layer 30-1 along a X axis direction at one end region in a Y axis direction. In other words, the resin layer 30-2 is printed in a region where the resin layer 31-1 is not printed and the resin layer 30-1 is exposed. And, these resin layers 30-1, 30-2, and 31-1 are printed in an adhered state.

Next, as illustrated in FIG. 4E and FIG. 4F, a third resin layer is printed. In other words, a resin layer 30-3 is printed on the resin layers 31-1 and 30-2 by using TPU as a filament, and a resin layer 31-2 is printed on the resin layer 31-1 by using PVA as a filament. The resin layer 31-2 corresponds to a cavity for passing through a body (trunk) of a wearer wearing a T-shirt, in a lower half region of a completed T-shirt, as well as the resin layer 31-1. Therefore, the resin layer 31-2 is printed on the resin layer 31-1 along a X axis direction such that it contacts one end region adjacent to the resin layer 30-2. The resin layer 30-3 corresponds to a back lower half region of a completed T-shirt in a region above the resin layer 31-1, and corresponds to a part connecting a front upper half region and a front lower half region of a completed T-shirt in a region above the resin layer 30-2. By this process, a lower half of a T-shirt is completed.

Next, as illustrated in FIG. 4G and FIG. 4H, a fourth resin layer is printed. In other words, a resin layer 31-3 is printed on the resin layers 30-3 and 31-2 by using PVA as a filament, and a resin layer 30-4 is printed on the resin layer 30-3 by using TPU as a filament. A partial region of the resin layer 31-3 corresponds to a cavity for passing through a body (trunk) of a wearer wearing a T-shirt, in a lower half region of a completed T-shirt. Therefore, this region of the resin layer 31-3 is printed to be overlapped with the resin layer 31-2 of the third layer in a Z axis direction. A remaining region of the resin layer 31-3 is arranged for separating a back upper half region and a back lower half region in a completed T-shirt, and it is printed to be overlapped with a lower half region of a T-shirt in the resin layer 30-3 of the third layer in a Z axis direction. Also, the resin layer 30-4 corresponds to a part connecting a lower half region and an upper half region of a completed T-shirt, and it is printed such that a perimeter of a region for forming a cavity of T-shirt in the resin layer 31-3 will be surrounded.

Next, as illustrated in FIG. 4I and FIG. 4J, a fifth resin layer is printed. In other words, a resin layer 30-5 is printed on the resin layers 30-4 and 31-3 by using TPU as a filament, and a resin layer 31-4 is printed on the resin layer 31-3 by using PVA as a filament. The resin layer 31-4 corresponds to a cavity for passing through a body (trunk) of a wearer wearing a T-shirt, in an upper half region of a completed T-shirt. Therefore, the resin layer 31-4 is printed to be overlapped with the resin layer 31-3 of the fourth layer in a Z axis direction. And, the resin layer 30-5 is printed on other regions. The resin layer 30-5 corresponds to a back upper half region of a completed T-shirt, and contacts with the resin layer 30-4 of the fourth layer.

Next, as illustrated in FIG. 4K and FIG. 4L, a sixth resin layer is printed. In other words, a resin layer 30-6 is printed by using TPU as a filament, and a resin layer 31-5 is printed by using PVA as a filament. The resin layer 31-5 corresponds to a cavity for passing through a body (trunk) of a wearer wearing a T-shirt, in an upper half region of a completed T-shirt. Also, the resin layer 30-6 corresponds to a part connecting a front lower half region and a front upper half region of a completed T-shirt. Therefore, the resin layer 31-5 is printed in a size smaller than a size of the resin layer 30-5 of the fifth layer in a XY plane, and the resin layer 31-5 is printed such that both end portions of the resin layer 30-5 in a X axis direction and both end portions of the resin layer 30-5 in a Y axis direction will be exposed. In addition, as illustrated in FIG. 4L, the resin layer 31-5 is printed such that an end matches an end of the resin layer 30-5 in a partial region of an end opposite to a region for connecting with a lower half region of a completed T-shirt in a X axis direction. In other words, the resin layer 31-5 is having a protruding shape in a XY plane. This protruding region corresponds to a part to pass through a neck of a wearer in a completed T-shirt. And, the resin layer 30-6 is printed in a region where the resin layer 31-5 is not printed and the resin layer 30-5 is exposed.

Next, as illustrated in FIG. 4M, a seventh resin layer is printed. In other words, a resin layer 30-7 is printed on an entire surface of the sixth resin layer by using TPU as a filament. In addition, the resin layer 30-7 may have a curve-shaped portion around a neck portion of a completed T-shirt to facilitate a wearing by a wearer. From the above, a 3D printing for manufacturing a T-shirt is completed. FIG. 4N is describing a cross-sectional structure illustrated in FIG. 4M per a type of filament. As illustrated, a layer of TPU and a layer of PVA are printed alternatingly. And, in one end in a YZ plane, TPU of the first layer and TPU of the seventh layer are connected, PVA of the second layer and PVA of the sixth layer are connected, and TPU of the third layer and TPU of the fifth layer are connected. TPU of the first layer, PVA of the second layer, and TPU of the third layer are a region for forming a lower half region R low of a T-shirt. Also, TPU of the fifth layer, PVA of the sixth layer, and TPU of the seventh layer are a region for forming an upper half region R top of a T-shirt. And, PVA of the fourth layer is a region for separating the lower half region R low and the upper half region R top when PVA is dissolved later.

Also, FIG. 4O and FIG. 4P are cross-sectional views in a XZ plane when a structure body illustrated in FIG. 4M is completed, and illustrating a structure at a side opposite to a side for connecting a lower half region and an upper half region of a T-shirt (left end side of a structure body described in FIG. 4M). FIG. 4P is illustrating a cross-sectional structure of FIG. 4O per a type of filament as well as FIG. 4N. As illustrated, a layer of TPU and a layer of PVA are printed alternatingly. And, TPU of the first layer and TPU of the third layer are connected at both ends in a XZ plane, and TPU of the fifth layer and TPU of the seventh layer are connected at both ends in a XZ plane. TPU of the first layer, PVA of the second layer, and TPU of the third layer are a region for forming a lower half region R low of a T-shirt, and PVA of the second layer corresponds to a cavity for passing through a body (trunk) of a wearer. Also, TPU of the fifth layer, PVA of the sixth layer, and TPU of the seventh layer are a region for forming an upper half region R top of a T-shirt, and PVA of the sixth layer corresponds to a cavity for passing through a body (neck) of a wearer. And, PVA of the fourth layer is a region for separating the lower half region R low and the upper half region R top when PVA is dissolved later.

Then, as well as the first embodiment, a structure body illustrated in FIG. 4M to FIG. 4P is impregnated in a hot water. In this way, the resin layers 31-1 to 31-5 printed by using PVA as a filament will be dissolved. And, by spreading out a lower half region and an upper half region of a T-shirt, and further, by spreading out sleeve portions, a T-shirt illustrated in FIG. 4Q is completed. In addition, in the above explanation, an explanation about a process for manufacturing sleeve portions 30-8 has been omitted, but the sleeve portions 30-8 can be manufactured by performing a process similar to the process for manufacturing a lower half region and an upper half region of a T-shirt, for example after a process of FIG. 4G and FIG. 4H. In this way, as illustrated in FIG. 4Q, a T-shirt is completed by the resin layer 30-1 (region R low) to be a trunk portion of a T-shirt, the resin layer 30-7 (region R top) and the resin layers 30-8, in a front side of a T-shirt. In addition, it is omitted in FIG. 4Q, but the resin layers 30-2 to 30-6 exist between the resin layer 30-1 and the resin layer 30-7 as a region for connecting the resin layer 30-1 and the resin layer 30-7. In other words, a T-shirt comprises a first resin layer 30-1, a second resin layer 30-2 to 30-6, and a third resin layer 30-7. And, it is an article to be used by spreading out at a region including the second resin layer 30-2 to 30-6. And, in this T-shirt, in a state folded at a region including the second resin layer 30-2 to 30-6, the second resin layer 30-2 to 30-6 is one end of the first resin layer 30-1 and the third resin layer 30-7, and formed between the first resin layer 30-1 and the third resin layer 30-7. And, the first resin layer 30-1, the second resin layer 30-2 to 30-6, and the third resin layer 30-7 are formed by same resin (for example TPU).

As the above, the method explained in the first embodiment can be applied to manufacture a garment such as a T-shirt. In a general FDM type 3D printer, for example, a size of the plate 14 is often about a A4 size, and it is often too small for manufacturing a T-shirt. However, by printing a T-shirt in a folded state as the present embodiment, for example, even by a small 3D printer for household use, a T-shirt can be manufactured. Further, respective portions composing a T-shirt illustrated in FIG. 4P, that is, regions of a back lower half, a front lower half, a back upper half, a front upper half, and sleeves are adhered to each other by using TPU. And, PVA can be removed by impregnating in a hot water 40, so a T-shirt can be manufactured easily, without stitching respective portions.

In addition, in a T-shirt manufactured by the above method, a structure similar to a protrusion 30B explained in FIG. 2F of the first embodiment may be generated, for example, at a connection between the resin layer 30-1 and the resin layer 30-7, and at a connection between the resin layer 30-7 and the resin layer 30-8, in FIG. 4Q. It is preferable to use this protrusion as a design of the T-shirt. Also, it is possible to arrange the protrusion according to a position of a design by adjusting a position of the protrusion when manufacturing.

Third Embodiment

Next, explaining about articles relating to a third embodiment and a method for manufacturing the articles. The present embodiment relates to a method for manufacturing a plurality of articles at once by using TPU and PVA as a filament of a 3D printer, as well as the first embodiment. In below, it is only explained about points different from the first embodiment. FIG. 5A and FIG. 5C are respectively cross-sectional views sequentially illustrating a structure body printed on the plate 14 (structure viewed in a YZ plane), FIG. 5B and FIG. 5D are respectively top views of a structure body obtained in a process of FIG. 5A and FIG. 5C (structure viewed in a XY plane), and FIG. 5C is a front view of completed articles (structure viewed in a XY plane).

At first, as explained in FIG. 2A of the first embodiment, a resin layer 30-1 (for example, a first resin layer) is printed on the plate 14 by using TPU as a filament. Here, for simplifying an explanation, a rectangular article is exemplified, but the resin layer 30-1 may be printed in any desired shape. Next, as illustrated in FIG. 5A and FIG. 5B, a resin layer 31-1 (for example, a second resin layer) is printed on the resin layer 30-1 by using PVA as a filament. Different from the first embodiment, the resin layer 31-1 relating to the present embodiment covers an entire surface of the resin layer in a XY plane. Further, as illustrated in FIG. 5C and FIG. 5D, a resin layer 30-2 (for example, a third resin layer) is printed on the resin layer 31-1 by using TPU as a filament. The resin layer 30-2 is printed in a shape similar to the resin layer 30-1.

Then, as explained in FIG. 2D of the first embodiment, a structure body including the resin layers 30-1, 31-1, and 30-2 formed by the process of FIG. 5C and FIG. 5D is impregnated in a hot water 40. In this way, the resin layer 31-1 is dissolved and removed. As a result, as illustrated in FIG. 5E, two articles in an identical shape formed by the resin layers 30-1 and 30-2 are completed. In addition, in an example of FIG. 5A to FIG. 5D, it is explained about a case in which two layers are printed by TPU, but three layer or more may be printed by TPU. In this case, three or more articles in an identical shape can be manufactured at once.

As the above, according to the method relating to the present embodiment, a resin layer 30 using TPU as a filament and a resin layer 31 using PVA as a filament are printed alternatingly. And, when each resin layer 30 forms respective article independently, by impregnating a structure body in which the resin layers 30 and 31 are printed alternatingly in a hot water, a plurality of articles can be manufactured at once by each resin layer 30. In addition, in the present embodiment, it is explained about a case in which the resin layers 30-1 and 30-2 for forming each article is in an identical shape, but they may be in different shapes respectively. In this way, a plurality of articles in different shapes can be manufactured at once.

Fourth Embodiment

Next, explaining about articles relating to a fourth embodiment and a method for manufacturing the articles. In the third embodiment, it is explained about a case in which one article is formed by one resin layer 30, but the present embodiment relates to a case in which one article is formed by a plurality of resin layers 30. In other words, the present embodiment corresponds to a combination of the first embodiment and the third embodiment. In below, it is only explained about points different from the third embodiment. FIG. 6A to FIG. 6D are sequentially illustrating a method for manufacturing articles relating to the present embodiment, FIG. 6A, FIG. 6B and FIG. 6D are cross-sectional views in a YZ plane, and FIG. 6C is a top view of a structure of FIG. 6B in a XY plane.

At first, a structure of FIG. 2H (i. e. FIG. 2C) explained in the first embodiment is formed. Also, in this example, for simplifying an explanation, exemplifying a case in which a rectangular article is formed, but an article may be in various desired shapes. Next, as illustrated in FIG. 6A, a resin layer 31-2 (for example, a fourth resin layer) is printed on the resin layer 30-2 by using PVA as a filament. The resin layer 31-2 relating to the present embodiment covers an entire surface of the resin layer 30-2 in a XY plane.

Further, as illustrated in FIG. 6B and FIG. 6C, a structure similar to the structure illustrated in FIG. 2C and FIG. 2H is formed on the resin layer 31-2. In other words, a resin layer 30-3 (for example, a fifth resin layer) is printed on the resin layer 31-2 by using TPU as a filament. Further, a resin layer 31-3 (for example, a sixth resin layer) using PVA as a filament and a resin layer 30-4A using TPU as a filament are printed on the resin layer 30-3. The resin layer 30-4A is printed along a X axis direction at one end in a Y axis direction on the resin layer 30-3, as well as the resin layer 30-2A explained in FIG. 2C and FIG. 2H.

Further, as illustrated in FIG. 6D, a resin layer 30-4B (for example, a seventh resin layer) using TPU as a filament is printed on the resin layer 31-3 and the resin layer 30-4A. The resin layer 30-4A contacts the resin layer 30-4B, and a resin layer 30-4 formed by these resin layers is having a shape in which one end is bended in a Z axis direction as well as the resin layer 30-2, and contacts the resin layer 30-3.

As a result of the above, a structure body including the resin layers 30-1, 31-1, and 30-2 for forming a first article, the resin layers 30-3, 31-3, and 30-4 for forming a second article, and a resin layer 31-2 for separating the first article and the second article, is completed. Then, by impregnating the completed structure body in a hot water, the resin layers 31-1, 31-2, 31-3 will be dissolved and removed. As a result, two articles of the article explained in FIG. 2E and FIG. 2F are completed.

As the above, the method explained in the third embodiment can be applied to a case in which each article to be manufactured is formed by a plurality of resin layers 30. Also, in the above explanation, for simplifying an explanation, it is exemplifying a case in which a rectangular article as explained in the first embodiment is formed, but for example, the structure body for forming a garment as explained in the second embodiment may be printed plurally along a Z axis direction. In this way, a plurality of garments can be manufactured at once.

<Variants>

In addition, the above embodiment is only an example, and various modifications can be made. For example, as illustrated in FIG. 7, two nozzles 13-1 and 13-2 and two heaters 12-1 and 12-2 may be arranged in the 3D printer 10 explained in FIG. 1. In this case, for example, one nozzle 13-1 and one heater 12-1 may be used for printing TPU, and other nozzle 13-2 and other heater 12-2 may be used for printing PVA.

Also, a 3D printer 10 as illustrated in FIG. 7 is suitable for printing resin layers 30 with different colors. As illustrated in FIG. 8A, when manufacturing a T-shirt, considering about a case that letters 50 as "moon" is printed for example in a front of a T-shirt. As a printing method in this case, methods of FIG. 8B and FIG. 8C can be considered. FIG. 8B and FIG. 8C are cross-sectional views of a resin layer 30-7 explained using FIG. 4N and FIG. 4O in the second embodiment. In an example of FIG. 8B, a resin layer 30-7 is printed by using TPU having a color different from other regions (TPU colored in a color of letters 50), in a same layer as a resin layer 30-7. Also, as illustrated in FIG. 8C, letters 50 may be formed by printing a resin layer 30-9 using a colored TPU as a filament on the resin layer 30-7. When using filaments with different colors as the above, the 3D printer 10 having a plurality of nozzles 13 as FIG. 7 is effective. For example, when printing letters as "moon" in red color on a white T-shirt, the nozzle 13-1 in FIG. 7 may be used for printing TPU in white color, and the nozzle 13-2 in FIG. 7 may be used for printing TPU in red color. In this way, a time for changing a filament can be omitted.

Actual photographs of T-shirts manufactured by the method explained in the above embodiment are illustrated in FIG. 9A to FIG. 9E. FIG. 9A illustrates a state that a T-shirt is printed in a folded shape. As explained in the above, in FIG. 9A, letters as "moon" is printed in an upper half of a T-shirt. FIG. 9B illustrates a structure of FIG. 9A in more detail, and illustrates a state of sleeves an explanation of which was omitted in the second embodiment. As illustrated, sleeves are printed, for example between an upper half region and a lower half region of a T-shirt. And, as illustrated in FIG. 9C, upper and lower portions of a T-shirt printed in a folded shape is spread out, and then, as illustrated in FIG. 9D, sleeves printed in a folded shape are spread out. As a result, a T-shirt as illustrated in FIG. 9E is completed. In addition, in an example of FIG. 9A to FIG. 9E, a T-shirt is printed in a mesh-shaped pattern. For example, in FIG. 4A and FIG. 4B of the second embodiment, it was explained by exemplifying a case that TPU 30-1 is printed at a front surface of a region for forming a T-shirt for manufacturing a T-shirt. However, for example in FIG. 4A and FIG. 4B, at first, a plurality of linear TPU along a Y direction are printed with a space between them, and further, a plurality of linear PVA along a Y direction are printed to fill a space between adjacent TPU. Then on these TPU and PVA, a plurality of linear TPU along a X direction are printed with a space between them, and further, a plurality of linear PVA along a X direction are printed to fill a space between adjacent TPU. In this way, a mesh-shaped pattern can be printed by printing TPU with linear shape in a X direction and in a Y direction to be overlapped with each other. However, for example, in FIG. 4A and FIG. 4B, at first, a plurality of linear TPU along a Y direction are printed, and further, TPU and PVA may be printed alternatingly in a certain repetition pattern at a linear region between adjacent TPU. According to the present method, one cloth portion can be printed by one layer of TPU. In this way, TPU may be printed in a lattice shape.

In the above, few embodiments of the present invention were explained, but the present invention is not limited to the above embodiment, and it may be changed accordingly. And, the above configurations may be replaced by a substantially similar configuration, a configuration having a similar effect, or a configuration capable of achieving a similar purpose.

The invention claimed is:

1. An article comprising:

a first resin layer, a second resin layer, and a third resin layer, which is used by spreading out at a region including the second resin layer, wherein the first resin layer, the second resin layer, and the third resin layer are separate layers;

wherein the article is configured to be sufficiently flexible to be in a folded state and in an unfolded state;

wherein, in the article, in the folded state at a region including the second resin layer, the second resin layer is formed between the first resin layer and the third resin layer at one end of the first resin layer and the third resin layer, wherein the second resin layer bonded to the first resin layer on one side and bonded to the third resin layer on an opposite side; and wherein, in the folded state at a region including the second resin layer, a cavity is adjacent to the second resin layer and between the first resin layer and the third resin layer; and wherein, in the unfolded state, the second resin layer comprises a protrusion.

2. The article of claim 1, wherein the article comprises a plurality of sides and wherein the protrusion is between two sides of the article.

3. The article of claim 1, wherein the cavity is for passing through a part of a body of a person.

4. The article of claim 1, wherein the first resin layer, the second resin layer, and the third resin layer comprise Thermoplastic Polyurethane (TPU).

5. The article of claim 4, wherein the TPU for at least one of the first resin layer, the second resin layer, or the third resin layer is of a different color than at least one other of the first resin layer, the second resin layer, or the third resin layer.

6. The article of claim 1, wherein the first resin layer, the second resin layer, and the third resin layer are 3D printed.

7. The article of claim 6, wherein the cavity is formed by positioning a layer between the first resin layer and the third resin layer, and thereafter removing the layer.

8. The article of claim 7, wherein the layer comprises a water soluble layer that is 3D printed between the first resin layer and the third resin layer.

9. The article of claim 1, wherein the first resin layer and the third resin layer are connected on opposite sides of the article to form a hole.

10. The article of claim 9, wherein the hole is for passing through a part of a body of a person.

11. The article of claim 1, wherein the second resin layer has a hole.

12. The article of claim 1, wherein the first resin layer, the second resin layer and the third resin layer form at least part of a sleeve of a garment.

13. The article of claim 12, wherein, in the folded state, the cavity is formed between the sleeve and another part of the article.

14. The article of claim 1, wherein at least one the first resin layer or the third resin layer are printed in a pattern.

15. The article of claim 1, wherein at least one the first resin layer or the third resin layer are printed in a lattice shape.

16. The article of claim 1, wherein the first resin layer and the third resin layer are printed in different colors.

17. The article of claim 1, wherein at least one of the first resin layer or the third resin layer have printed thereon indicia at least one letter.

18. The article of claim 1, wherein the article comprises a garment.

19. The article of claim 18, wherein the garment comprises a shirt, a blouse, pants, a skirt, a dress, a scarf, gloves, or a belt.

20. The article of claim 1, wherein the article comprises shoes.

21. The article of claim 1, wherein the article comprises a case.

22. The article of claim 1, wherein the article includes at least a first protrusion and a second protrusion.

23. The article of claim 22, where the first protrusion and the second protrusion connect the first resin layer and the third resin layer at opposite sides of the article.

24. The article of claim 1, wherein the article comprises a 3D printed article.

* * * * *